(12) United States Patent
Stankovic et al.

(10) Patent No.: US 12,148,218 B2
(45) Date of Patent: **\*Nov. 19, 2024**

(54) ANALYZING SENSOR DATA TO IDENTIFY EVENTS

(71) Applicant: Amazon Technologies, Inc., Seattle, WA (US)

(72) Inventors: Ivan Stankovic, Maple Valley, WA (US); Joseph M Alyea, Edmonds, WA (US); Jiajun Zhao, Kirkland, WA (US); Kartik Muktinutalapati, Redmond, WA (US); Waqas Ahmed, Clyde Hill, WA (US); Dilip Kumar, Seattle, WA (US); Danny Guan, Seattle, WA (US); Nishitkumar Ashokkumar Desai, Redmond, WA (US); Longlong Zhu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,077

(22) Filed: Jun. 2, 2023

(65) Prior Publication Data

US 2023/0394831 A1   Dec. 7, 2023

Related U.S. Application Data

(63) Continuation of application No. 17/106,755, filed on Nov. 30, 2020, now Pat. No. 11,688,170.

(51) Int. Cl.
*G06V 20/52* (2022.01)
*G06F 18/21* (2023.01)
(Continued)

(52) U.S. Cl.
CPC .......... *G06V 20/52* (2022.01); *G06F 18/2163* (2023.01); *G06F 18/24* (2023.01);
(Continued)

(58) Field of Classification Search
CPC ...... G06V 20/52; G06V 10/25; G06V 40/107; G06V 40/11; G06V 40/28; G06F 18/2163;
(Continued)

(56) References Cited

U.S. PATENT DOCUMENTS 9,117,106 B2   8/2015   Dedeoglu et al.
9,235,928 B2   1/2016   Medioni et al.
(Continued)

FOREIGN PATENT DOCUMENTS

JP    2018206372 A    12/2018
KR    20190119547 A   10/2019

OTHER PUBLICATIONS

Office Action for U.S. Appl. No. 17/106,755, mailed on Oct. 28, 2022, Ivan Stankovic, "Analyzing Sensor Data to Identify Events", 19 pages.
(Continued)

*Primary Examiner* — John B Strege
(74) *Attorney, Agent, or Firm* — Lee & Hayes, P.C.

(57) ABSTRACT

This disclosure is directed to techniques in which a first user in an environment scans visual indicia associated with an item, such as a barcode, before handing the item to a second user. One or more computing devices may receive an indication of the scan, retrieve image data of the interaction from a camera within the environment, identify the user that received the item, and update a virtual cart associated with the second user to indicate addition of the item.

20 Claims, 11 Drawing Sheets

(51) Int. Cl.
*G06F 18/24* (2023.01)
*G06K 7/14* (2006.01)
*G06Q 30/0601* (2023.01)
*G06T 7/70* (2017.01)
*G06V 10/25* (2022.01)
*G06V 40/10* (2022.01)

(52) U.S. Cl.
CPC ....... *G06K 7/1413* (2013.01); *G06Q 30/0633* (2013.01); *G06T 7/70* (2017.01); *G06V 10/25* (2022.01); *G06V 40/107* (2022.01); *G06T 2207/30196* (2013.01); *G06T 2207/30232* (2013.01)

(58) Field of Classification Search
CPC .. G06F 18/24; G06K 7/1413; G06Q 30/0633; G06Q 30/06; G06Q 10/087; G06Q 10/26; G06Q 20/203; G06T 7/70; G06T 2207/30196; G06T 2207/30232; G07G 1/0054
See application file for complete search history.

(56) References Cited

U.S. PATENT DOCUMENTS

| | | |
|---|---|---|
| 9,473,747 B2 | 10/2016 | Kobres et al. |
| 10,127,438 B1 | 11/2018 | Fisher et al. |
| 10,133,933 B1 | 11/2018 | Fisher et al. |
| 10,332,066 B1 | 6/2019 | Palaniappan et al. |
| 10,699,537 B1 | 6/2020 | Schoner |
| 10,861,085 B1 | 12/2020 | Magee et al. |
| 10,953,906 B1 | 3/2021 | McMahon et al. |
| 11,688,170 B2 * | 6/2023 | Stankovic ............ G06Q 10/087 382/103 |
| 2013/0284806 A1 | 10/2013 | Margalit |
| 2015/0193115 A1 | 7/2015 | Chirakan et al. |
| 2018/0240180 A1 | 8/2018 | Glaser |
| 2018/0330196 A1 | 11/2018 | Chaubard et al. |
| 2019/0236583 A1 | 8/2019 | Hagen et al. |
| 2020/0151696 A1 | 5/2020 | Plocher |
| 2020/0402042 A1 | 12/2020 | Ju et al. |
| 2022/0114647 A1 | 4/2022 | Bronicki et al. |
| 2022/0171972 A1 | 6/2022 | Stankovic et al. |

OTHER PUBLICATIONS

Office Action for U.S. Appl. No. 17/106,755, mailed Jul. 12, 2022, Stankovic, "Analyzing Sensor Data to Identify Events", 16 pages.
International Search Report and Written Opinion for PCT Application No. PCT/US21/61220, mailed Mar. 10, 2022, 16 pages.
Office Action for Japanese Application No. 2023-529063, Dated Apr. 22, 2024, 13 pages.

* cited by examiner

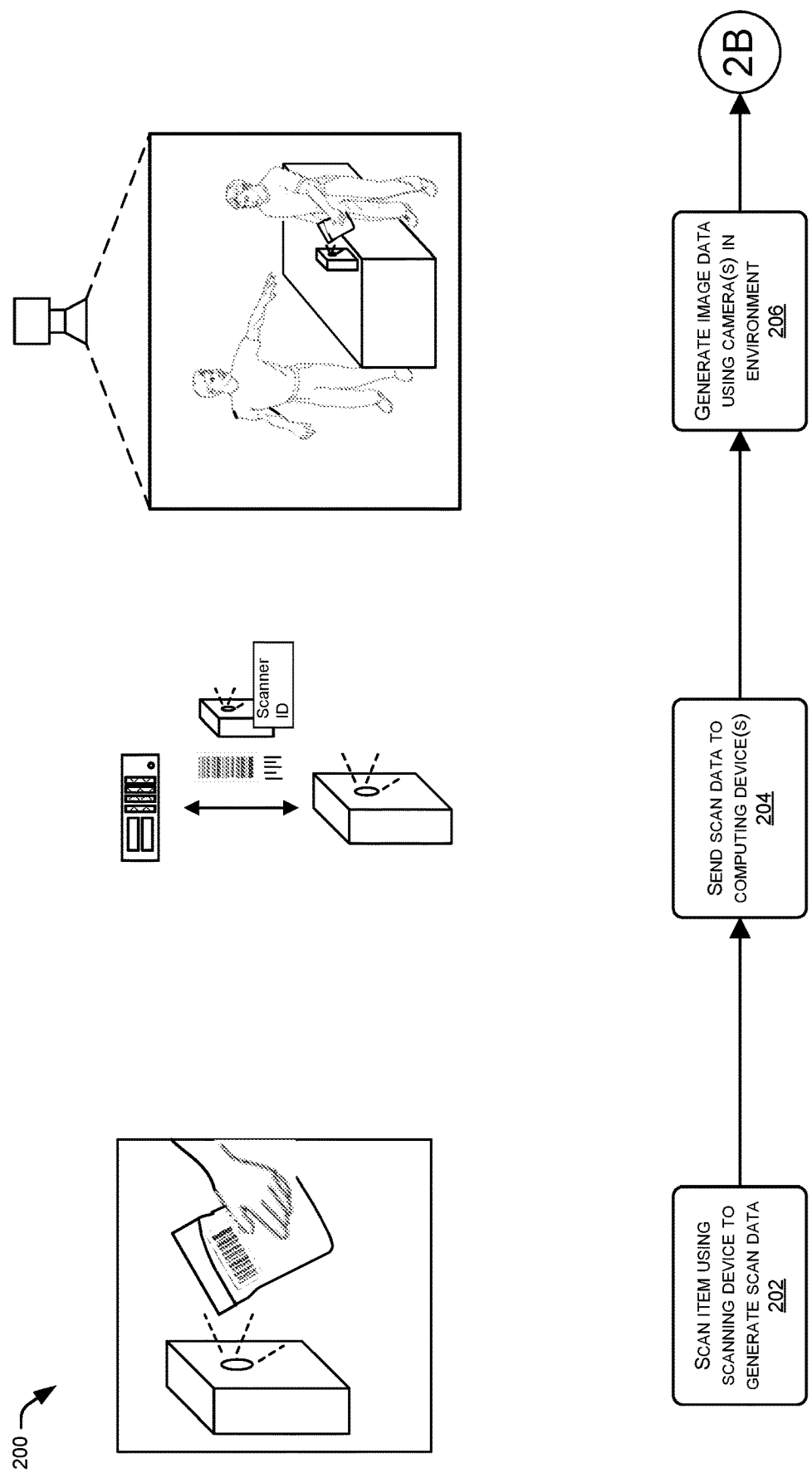

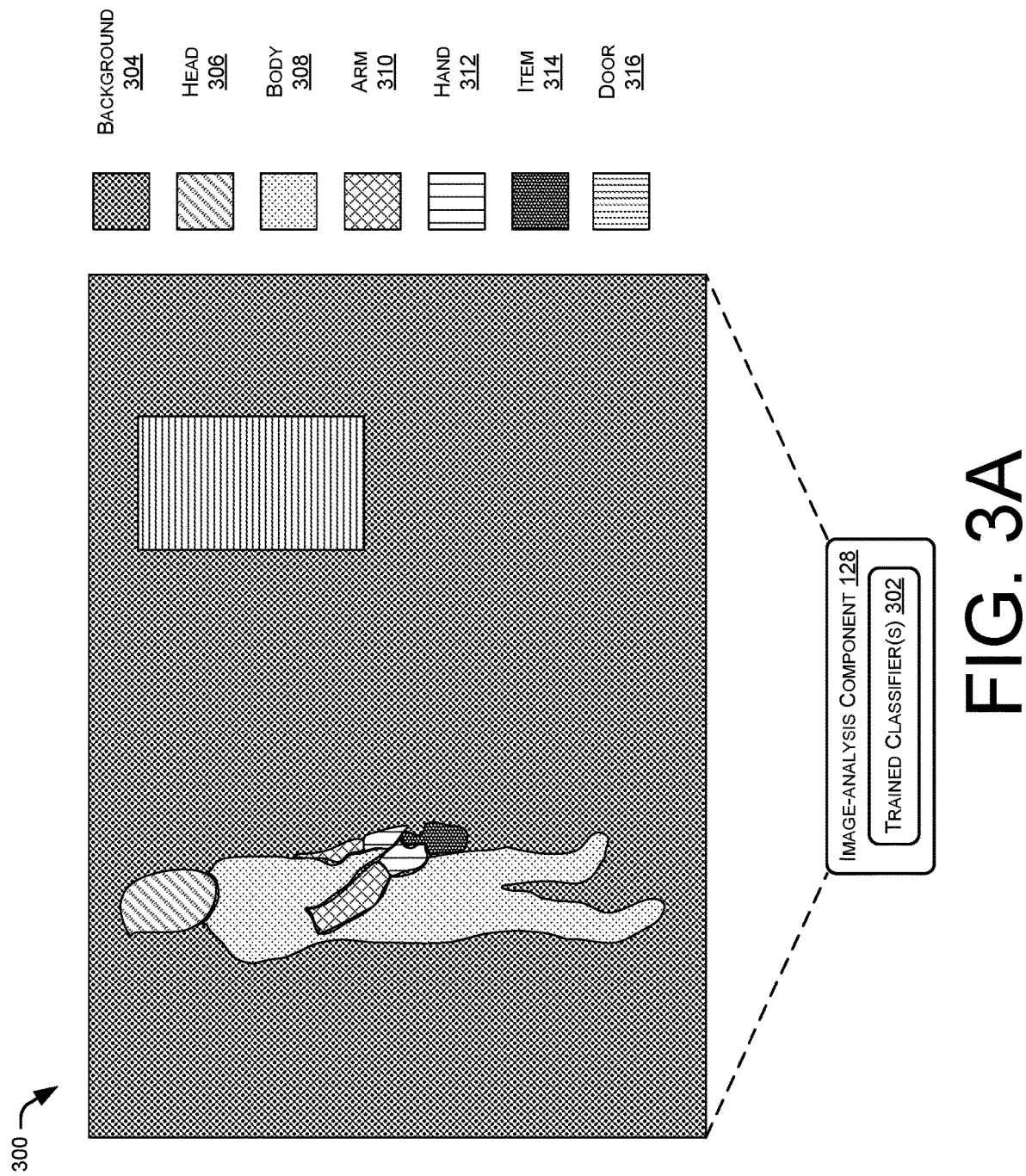

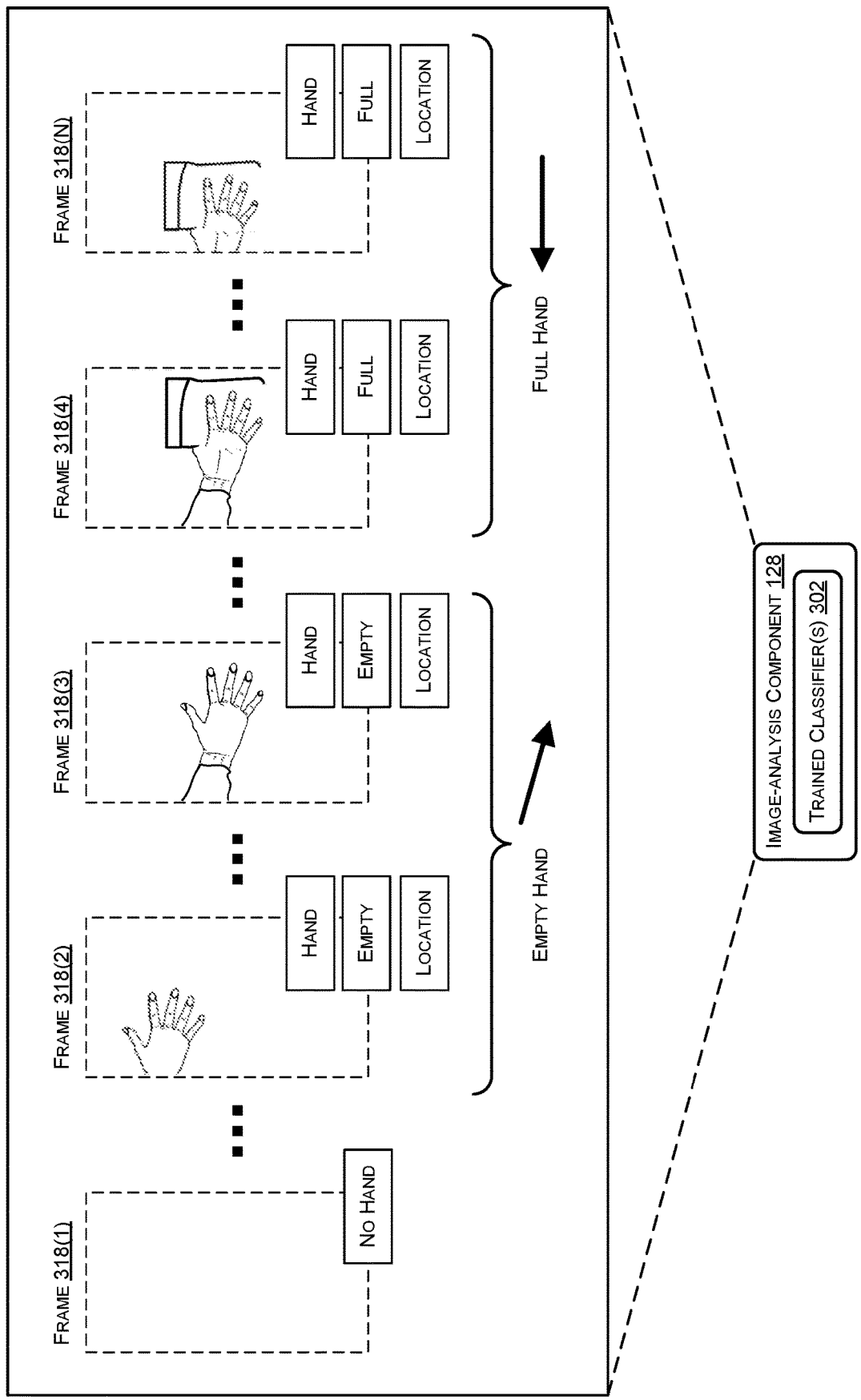

ANALYZING SENSOR DATA TO IDENTIFY EVENTS

RELATED APPLICATIONS

This application claims priority to and is a continuation of U.S. patent application Ser. No. 17/106,755, filed on Nov. 30, 2020, the entire contents of which are incorporated herein by reference.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer-accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A-C collectively illustrates an example sequence of operations in which a first user scans an item and hands the item to a second user, while one or more computing devices analyze image data of the environment near the interaction at the time of the scan to determine a user identifier associated with the second user that received the item.

FIG. 3A illustrates an image-analysis component using machine-vision algorithms to generate a segmentation map for a frame of image data. As illustrated, the segmentation map may indicate pixels that are associated with different objects, such as background, a hand of a user, an item, and the like.

FIG. 3B illustrates the image-analysis component using segmentation maps and one or more trained classifiers to determine, for individual frames of image data, whether the frame includes a hand and, if so, a location of the hand and whether it is empty or full. The image-analysis component may use this information to identify a user that acquires an item after it has been scanned using a scanning device.

DETAILED DESCRIPTION

Figure 1:
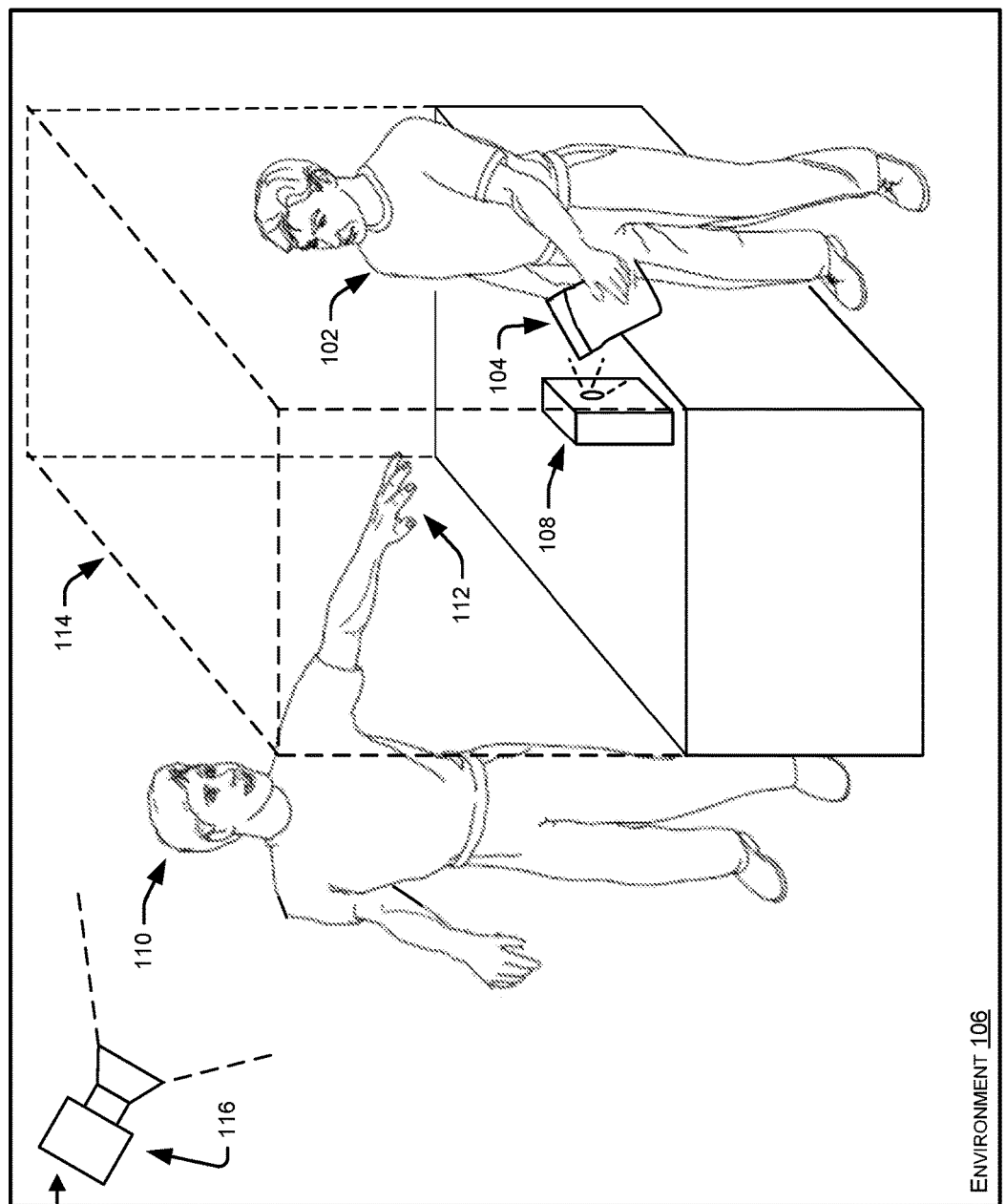
FIG. 1 illustrates an example architecture in which a first user in an environment scans visual indicia associated with an item, such as a barcode, before handing the item to a second user. The architecture also includes server computing devices configured to receive an indication of the scan, retrieve image data of the interaction from a camera within the environment, identify the user that received the item, and update a virtual cart associated with the second user to indicate addition of the item.

This disclosure is directed to systems and techniques for identifying events that occur within a facility using sensor data generated by sensors in the facility. In one example, the techniques and systems may identify an event in response to a first user using a scanning device to scan visual indicia (e.g., barcode, QR code, etc.) of an item and a second user receiving the item. After identifying the second user receiving the item, the systems and techniques may update a virtual cart associated with the second user to indicate addition of the item. In some examples, the systems and techniques may be performed within a "just walk out" retail environment in which virtual carts of respective users may be maintained such that the users may retrieve and otherwise receive items and then "just walk out" of the facility such that respective prestored payment instruments of the users may be charged for costs of their virtual carts in response to the users exiting the facility.

In some examples described below, an associate (e.g., employee, etc.) of a facility may scan visual indicia of an item before handing the item to a customer within the facility. In some instances, the item comprises a made-to-order item (e.g., a customized salad or sandwich, etc.), a variable-weight item (e.g., a certain amount of seafood or meat, etc.), a variable-amount item (e.g., a certain length of quilting materials), or any other type of item whose cost varies on the amount or other parameters (e.g. toppings) of the item actually received by the customer. Thus, after the customer places an order, such as for one pound of shrimp, a yard of fabric, or the like, the associate may package the requested item in the requested amount and may use a printing device to print visual indicia associated with the item. For example, the associate may use a scale to measure the amount of the item and a printer to print a barcode, QR code or the like, with this visual indicia encoding information regarding the item, such as an item identifier of the item, a weight/amount of the item, a cost of the item, a time of the scan, and/or the like. In some instances, the associate may then affix the visual indicia to the item or packaging of the item. For example, the printer may print an adhesive sticker that includes the visual indicia, which the associate may then adhere to the item or the packaging.

After affixing the visual indicia to the item, the associate may then user a scanning device to scan the visual indicia. For example, the associate may use a barcode scanner, a tablet computing device, or any other device that includes a camera or other imaging device to identify or otherwise capture information regarding the visual indicia. The scanning device may generate scan data, which may be indicative of the information noted above, such as the identity of the item, a weight/amount of the item, a cost of the item, a time of the scan, and/or the like. This scan data may then be sent, via one or more networks, to one or more computing devices configured to validate the scan data and, thereafter, attempt to determine an event associated with the item that is associated with the scan data. The scan data sent to the computing devices may include, or may be accompanied by, an identifier of the associate signed in to the scanning device, an identifier of the scanning device, and/or the like.

The computing devices may receive the scan data and, in response or at a later time, may attempt to determine any events involving the scan data. For instance, the computing devices may determine the identity of the scanning device that generated the scan data and may determine a volume of interest (VOI) within the facility that is associated with the scanning device. That is, each scanning device in a facility may be associated with a respective VOI within the facility, which may comprise a portion of the environment (e.g., defined in X-Y-Z coordinates) in which a customer is likely to interact with (e.g., receive) the item associated with the scan data. For example, the VOI of each scanning device may comprise an X-Y-Z "box" that is defined relative to the respective scanning device, such as a bounding box that spans some or all of a countertop on which the scanning device resides and rises a predefined length (e.g., to the ceiling). In some instances, these VOIs are manually configured for each scanning device in an environment, while in other instances the VOIs may be determined by analyzing image data of the scanning devices and the area around these devices using cameras (e.g., overhead cameras) within the facility.

In either instance, upon receiving scan data, or at some time thereafter, the computing devices may determine the identity of the scanning device used to generate the scan data, which in turn may be used to determine the respective VOI of the scanning device. Upon identifying the VOI, the computing devices may determine a camera within the facility having a field-of-view (FOV) that includes the VOL. In addition, the computing devices may determine, from the scan data, a time associated with the scanning of the item. Upon identifying one or more cameras having the current VOI in their FOV, the computing devices may retrieve image data generated by this camera (or cameras) proximate to the time of the scan. That is, the computing devices may retrieve image data spanning the scan of the item (e.g., just prior to the scan and past the scan), at a time beginning at or just after the scan, or the like.

Upon receiving this image data, the computing devices may use one or more trained classifiers to determine any event(s) involving the item associated with the scan. For instance, the computing devices may first perform segmentation techniques on individual frames of the image data to identify what is represented in the frame. For example, the computing devices may configured to identify, within frames of image data, users, parts of users (e.g., hand, head, body, arm, etc.), background, countertops, or the like. These devices may utilize classifier(s) that have been trained using supervised learning or other techniques to identify predefined objects. In some instances, these classifier(s) output an indication of pixel values corresponding to the different objects, such as an indication that a first pixel at a first location corresponds to background, a second pixel corresponds to a hand, and so forth.

The computing devices may use this segmentation map to identify whether one or more hands are present within the spatiotemporal window around the scanning of the item. That is, the devices may determine any of the frames of the image data that are within a threshold amount of time of the scan include a hand that is within the VOI of the scanning device. If so, then the computing devices may determine a user identifier of the user whose hand is in the VOI within the threshold amount of time of the scan. In response to identifying this user identifier, the computing devices may update a virtual cart associated with the user.

In some instances, the computing devices may make this determination over time rather than simply based on identifying a hand within a frame of the image data. For example, in addition to having been trained to identify a hand of a user, the classifier(s) may be trained to output a score indicate whether the hand is likely full or likely empty. Further, the computing devices may store respective indications of first scores indicating whether a respective frame includes a hand second scores indicating whether the identified hand (if any) is empty or full. The computing devices may also store the location of the identified hands. Some or all of this information may be stored over time, such as the devices are able to identify motion vectors indicating how the identified hand moved within the VOI over time.

For example, after determining the spatiotemporal window associated with the scan data, the computing devices may analyze image within this spatiotemporal by generating feature data associated with frames of the image data and inputting this feature data into one or more trained classifiers. These classifier(s) may indicate a location of a hand with the image data, an indication of whether the hand is empty or full (if any), and a location of the hand (if any). In response to identifying an empty hand going "into" the VOI and a full hand coming "out" of the VOI, the computing devices may determine that a user associated with the hand has received the item.

Thus, in response to determining that a user has received the item, the systems may call or otherwise interact with a location component configured to maintain a location of each user identifier within the facility at a given time. That is, upon a user entering the facility, the system may assign a user identifier to this user (which, in some instances, may be free from personal-identification data) and may use image data and/or the like to maintain the location of the user identifier within the facility over time. Thus, when the computing devices determine that a hand received the item within the spatiotemporal window associated with the scan data, the computing devices may determine, from the locating component, which user identifier was present at the location of the item at the time of the handoff Upon receiving the indication of the user identifier, the system may update a virtual cart associated with the user identifier to indicate addition of the item. For example, the virtual cart of the user may be updated to indicate that she has received. 1.2 pounds of shrimp costing $9.89.

Thus, the techniques enable a customer to request a made-to-order or variable-weight/size item from an associate, who in turn may prepare the item, print visual indicia for the cost of the item, affix the visual indicia to the item, scan the visual indicia, and had the item to the requesting user. In response, or sometime after this interaction, the systems and techniques described herein may analyze image data that represents this interaction to determine which user actually received the item. For example, the systems and techniques may analyze a predefined VOI associated with the scanning device within a threshold amount of time to identify the presence of a hand within the VOI and, potentially, information regarding the hand, such as whether it was full or empty, its location over time, and/or the like. This information may be used to determine that a hand—and thus a user-did in fact receive the item. After making this determination, the systems and techniques may then determine which user is associated with the hand and, after making this determination, may update the virtual cart of the appropriate user.

In some instances, the systems and techniques described herein may be performed in response to the computing devices receiving an indication of the scan data. That is, in response to the associate (or other user) scanning the item, the techniques may be performed, in response, to determine a user identifier associated with a user that receives the item. In other instances, meanwhile, a different trigger may cause this determination. For example, the techniques may be performed within a system that determines the contents of a user's virtual cart in response to a user exiting the facility. In this example, the system may determine a set of candidate users for each potential event within the facility and may resolve each event for a particular user in response to the user exiting the environment. For instance, if a particular user were near (e.g., within a threshold distance of) the meat counter of a facility when an item was scanned at the meat counter, this user may be marked as a candidate user for this particular event involving the scanned item. Upon the user exiting the store, the system may determine whether it was in fact this user that received the item, using the techniques described above and below, and, if so, may update the virtual cart of the user at this time. In sum, different triggers may cause execution of the techniques described herein.

In addition, while the above examples describe using vision-based classifiers to determine the presence (and, potentially state and direction) of a hand in a VOI to determine a user receiving an item, in other instances one or more other factors may be used to make this determination. For instance, vision algorithms may be used to track an item that is scanned by a scanning device until it is received by another user in the facility. That is, when an item is scanned, one or more computer-vision algorithms may be used to identify the scanned item and to track the location of the scanned item (e.g., within the VOI or otherwise) within the image data over time at least until a user that is different than the user that scanned the item receives the item. At this point, the virtual cart of the receiving user may be updated.

In addition, or in the alternative, the location of the associate (or other user that scanned the item) may be maintained over time. For instance, upon the associate scanning an item, one or more computer-vision algorithms may be used to identify the associate that performed the scan and to continue to locate this associate in the image data over time until the item is passed to another user. Again, this may result in an update to the virtual cart associated with the receiving user.

Further, while the discussion above and below includes examples of scanning devices associated with fixed locations, it is to be appreciated that the techniques may also apply to mobile scanning devices, such as examples where an associate of a store uses a mobile device to scan items and hand them to respective users. For example, upon the associate using the mobile scanning device to scan an item, the device may provide the scan data to the one or more computing devices described above. These computing devices may determine, using an identifier of the mobile scanning device, a current location of the mobile device and/or the associate within the facility. That is, the computing devices may determine a location of the device and/or the associate using a tracking component of the system maintaining current locations of customers and associates within the store. This information, in turn, may be used to determine one or more cameras (e.g., overhead cameras) having a FOV of the current location of the mobile scanning devices. The computing devices may then acquire image data from these camera(s) to analyze a VOI around the scanning device. As noted above, the VOI may be defined relative to the location of the scanning device. The computing devices may then use the techniques introduced above and described in further detail below for identifying a hand of a customer within the VOI, such as an empty hand of the customer going into the VOI and a full hand going out of the VOL. A user identifier associated with this hand may then be used to update a virtual cart of the corresponding user.

Finally, while the examples included herein are described with reference to a single item, it is to be appreciated that the techniques may also apply to multiple items. In these instances, an associate may scan multiple items in a row before handing the group of items or a container (e.g., a bag or box) of the items to the customer. Here, the computing devices may first determine, from the respective scan data, that these items were scanned within a threshold amount of time relative to one another. For example, the computing devices may determine that less than a threshold amount of time elapsed between the scanning of an item and a subsequent item and, thus, that these items were scanned successively. In response to making this determination, the computing devices may analyze the VOI for a hand, using the techniques described above, and may associate each of the successively scanned items with the determined user identifier associated with the hand. Thus, if the associate scans, for example, five items before handing these items (e.g., in a bag) to a customer, the techniques may associate each of these five items with the same customer whose hand is identified within the VOL. Further, while the above example describes the computing devices determining that a group of items are related based on these items being scanned with a threshold amount of time of one another, in another example the scanning device may include a control (e.g., an icon) selectable by the associate to indicate that multiple items are going to be scanned and that these items are for a single customer. Thus, when the scan data of the multiple items is received by the computing devices, the computing devices may determine to associate each item with a common user identifier based on the described hand-identification and hand-tracking techniques.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. Certain implementations and embodiments of the disclosure will now be described more fully below with reference to the accompanying figures, in which various aspects are shown. However, the various aspects may be implemented in many different forms and should not be construed as limited to the implementations set forth herein.

The disclosure encompasses variations of the embodiments, as described herein. Like numbers refer to like elements throughout.

FIG. 1 illustrates an example architecture 100 in which a first user 102 scans an item 104 in environment 106 using a scanning device 108. For example, the first user 102 may comprise an associate (e.g., employee, etc.) of retail facility and may scan visual indicia associated with the item 104, such as a barcode, QR code, text, or the like, using any type of device capable of generating scan data encoding or otherwise indicative of details of the item. For example, the scanning device 108 may comprise a device configured to read a barcode or QR code affixed to the item 104. The item 104, meanwhile, may, in some instances, comprise a made-to-order or variable weight item and, thus, the first user 102 may use a scale, a printing device, and/or the like to generate the visual indicia, such as the barcode. After physically printing the barcode or the like, the first user may affix (e.g., adhere) the visual indicia to the item 104 either before or after scanning the item 104.

After scanning the item 104 using the scanning device 108, the first user may 102 may pass the item 104 to a second user 110, may set the item 104 on the counter for acquisition by the second user 110, or the like. In either instance, the second user 110 may reach his or her hand 112 into a volume of interest (VOI) 114 associated with the scanning device 108 in order to receive the item 104. The VOI 114 may comprise a three-dimensional area within the environment 106 that has been associated with the scanning device 108. While not illustrated, the environment 106 may include multiple scanning devices, each of which may be associated with a respective VOI.

In some instances, each VOI 114 within the environment 106 may be defined relative to a respective scanning device, such as the illustrated scanning device 108. For example, when the environment 106 is initially configured with sensors, such as scanning devices and cameras, an association may be stored by each scanning device an a respective three-dimensional space of the environment 106. This three-dimensional space may comprise the VOI 114, which may be adjacent to the respective scanning device 108, may include the scanning device 108, and/or the like. In one example, the VOI 114 corresponds to a three-dimensional space above the countertop on which the scanning device 108 resides. In another example, the VOI 114 comprises a volume defined by a radius around the scanning device. Therefore, the VOI 114 may comprise a three-dimensional volume of any shape, such as a sphere, a cuboid, or the like. Further, after an initial VOI is stored in association with a scanner, the VOI may be adjusted over time as interactions occur within the environment. Furthermore, while the above example describes pre-associating a VOI with a scanner, in other instances, VOIs may be determined dynamically as interactions occur within the environment 106.

As illustrated, the environment 106 may further include one or more camera, such as camera 116, for generating image data that may be used to identify users that receive items, such as to identify the second user 110 receiving the item 104. The environment 106 may include multiple cameras, such as overhead cameras, in-shelf cameras, and/or the like, configured to acquire image data of different and/or overlapping portions of the environment 106. Further, an association may be stored between each VOI and one or more cameras having respective fields of view (FOVs) that include some or all of the VOL. For example, an association may be stored between the illustrated VOI 114 and the illustrated camera 116, given that the FOV of the camera 116 includes the VOI 114 of the environment 106.

In response to the scanning device 108 generating the scan data, the scanning device 108 may send to the scan data to one or more server computing devices 118 via one or more networks 120. The networks 102 may represent any combination of one or more wired and/or wireless networks. The server computing devices 118, meanwhile, may reside at the environment, remote from the environment, and/or a combination thereof. As illustrated, the server computing devices 118 may comprise one or more processors 122 and memory 124, which may store, in part, a locating component 126, an image-analysis component 128, an event-determination component 130, and a virtual-cart component 132. In addition, the memory 124 may store, in one or more datastores, sensor data 134 received from one or more sensors in the environment (e.g., scanning devices, cameras, etc.), user data 136 indicating the location(s) of user identifiers within the environment 106, virtual-cart data (or "cart data") 138 indicating contents of respective users' virtual carts, and environment data 140 indicating information regarding sensors within the environment and the like, such as the locations of.

In response to receive the scan data from the scanning device 108, the server computing devices 118 may store the scan data in the sensor-data datastore 134. In response to receiving this scan data, or in response to another triggering event, such as the second user 110 or another user being detected as exiting the environment 106, the event-determination component 130 may attempt to determine the result of any event involving the scanned item 104. For example, the event-determination component may initiate a process for determining the identity of the user that received the item in order to update cart data associated with the identified user to indicate addition of the item.

In order to determine the result of the event involving the scanned item 104, the event-determination component 130 may instruct the image-analysis component 128 to analyze image data generated by one or more cameras in the environment having the appropriate VOI in the their FOVs to identify a user receiving the item 104. In addition, the event-determination component may utilize the locating component 126, which stores current and past locations of user identifiers in the environment 106 over time, in combination with output from the image-analysis component 128 to determine the result of the event involving the item 104. After determining the result, the event-determination component 130 may instruct the virtual-cart component 132 to update the appropriate virtual cart accordingly.

To begin, the image-analysis component 128 may receive an indication to analyze image data for a particular VOI in a particular time range. For instance, the event-determination component 130 may determine, from the scan data, the location at which the scan occurred and the time at which the scan occurred. For example, the scan data received from the scanning device 108 may include the time of the scan and the identity of the scanning device 108. The event-determination component may provide this information to the image-analysis component 128 or may otherwise use this information for causing the image-analysis component to analyze the appropriate spatiotemporal window, as described below.

After receiving the request from the event-determination component 130, the image-analysis component 128 may determine, from the environment data 140, which camera(s) includes an FOV of the VOI 114. That is, the environment data 140 may store respective indications of which cameras have views of which VOIs or may otherwise store an indication of which camera is to be used to determine events that occur within specific VOIs. In this instance, the image-analysis component 128 may determine that the illustrated camera 116 has an FOV that includes the VOI 114. Thus, the image-analysis component 128 may retrieve the image data from the sensor-data datastore 134 in order to run one or more computer-vision algorithms on the image data. In some instances, the image-analysis component 128 analyzes image data of the VOI 114 within a time range that is based at least in part on the time of the scan. For example, the image-analysis component 128 may analyze image data that begins at the time of the scan and extends thirty seconds afterwards, begins fifteen seconds before the scan and ends one minute afterwards, and/or the like.

After retrieving the image data, for the determined time range, that represents the current VOI 114, the image-analysis component 128 may use one or more trained classifiers to determine the event that occurred within the VOI 114. For example, the trained classifiers may first be configured to receive generated feature data regarding each frame of the image data and output, on a frame-by-frame basis, a segmentation map indicating predefined objects represented within a respective frame. For instance, the image-analysis component 128 may utilize a classifier that has been trained (e.g., via supervised learning) to identify background, a user, specific parts of a user (e.g., hand, head, arm, body, etc.), one or more items, and/or the like. FIG. 3A, discussed below, illustrates an example segmentation map.

In addition to generating segmentation maps for individual frames of the image data, the image-analysis component 128 may utilize one or more trained classifiers that are configured to identify, using at least the segmentation maps, an event that occurs within the VOI 114. For example, the classifiers may be configured to determine whether each frame of the image data includes a hand and, if so, a state of the hand, such as "empty" (not holding an item) or "full" (holding an item). In some instances, the trained classifiers may receive feature data generated from individual frames of the image data and generate, as output, a score indicating whether the individual frame includes a hand, a location of any such hand, and a score indicating whether the hand is empty or full. One or more thresholds may be applied against these scores for making a determination regarding whether each individual frame includes a hand and, if so, whether the hand is empty or full.

In addition to storing this information for each frame, the image-analysis component 128 may determine a motion vector of an identified hand within the VOI 114 over time. For example, if the image-analysis component 128 determines that an empty hand is detected at a first location in a first frame, an empty hand is detected at a second location in a second, subsequent frame, and so forth, the image-analysis component may use this information to determine a motion vector associated with the hand. Further, the image-analysis component 128 may include one or more trained classifiers configured to determine, based at least in part on these motion vectors and associated information regarding the state of the hand, whether a user received an item, gave back an item, or the like. For example, the image-analysis component 128 may have been trained (e.g., using supervised learning) to determine that an empty hand going "into" the VOI 114 and a full hand going "out" of the VOI 114 represents the user associated with the hand acquiring an item. Thus, the image-analysis component 114 may output an indication of a "take" or "pick" in this example. In a contrary example, the classifier(s) may be trained to determine that a full hand going into the VOI 114 and an empty hand going out of the VOI 114 may represent a return.

In the illustrated example, the image-analysis component 128 may determine (e.g., using one or more trained classifiers) that an empty hand entered the VOI 114 after the time of the scan of the item 104 and that a full hand thereafter exited the VOI 114. The image-analysis component 128 may provide this information and/or related information (e.g., an indication of a "take") to the event-determination component 130. In addition, the locating component 126 may locate user identifiers as corresponding users move throughout the environment and may store these locations over time as user data 136. For example, when the illustrated second user 110 entered the environment 106, the locating component 126 may have created an identifier associated with this user and may have stored the location of the user in association with this user identifier over time. In some instances, the user identifier may be free from personally identifiable information such that the actual identity of the user 110 is not tracked, but rather an identifier that has no other identifiable ties to the user 110.

The event-determination component 130 may use this user data 136, in addition to the data received from the image-analysis component 128, to determine a user identifier associated with the user 110 that acquired the item 104 (that is, to determine the user 110 associated with the hand identified in the VOI 114). For instance, the image-analysis component 128 (or the event-determination component 128) may have determined that a "take" of the item 104 occurred at a particular time (e.g., 10:23:55). The locating component 126 (or the event-determination component 130) may determine which user identifier was at the location of the VOI 114 at this particular time and may use this information to determine that the user associated with this user identifier took the item 104. In response to this determination, the event-determination component 130 may instruct the virtual-cart component 132 to update virtual-cart data 138 associated with the particular user identifier, such as the user identifier associated with the user 110. Using the techniques described above, the event-determination component may thus instruct the virtual-cart component to update the appropriate virtual-cart data 138 in response to the user 110 receiving the item 104 directly from the user 102 (e.g., as a handoff), in response to the user 110 taking the item 104 from the counter after the user 102 having placed the item 104 on the counter, and/or the like.

Figure 2B:
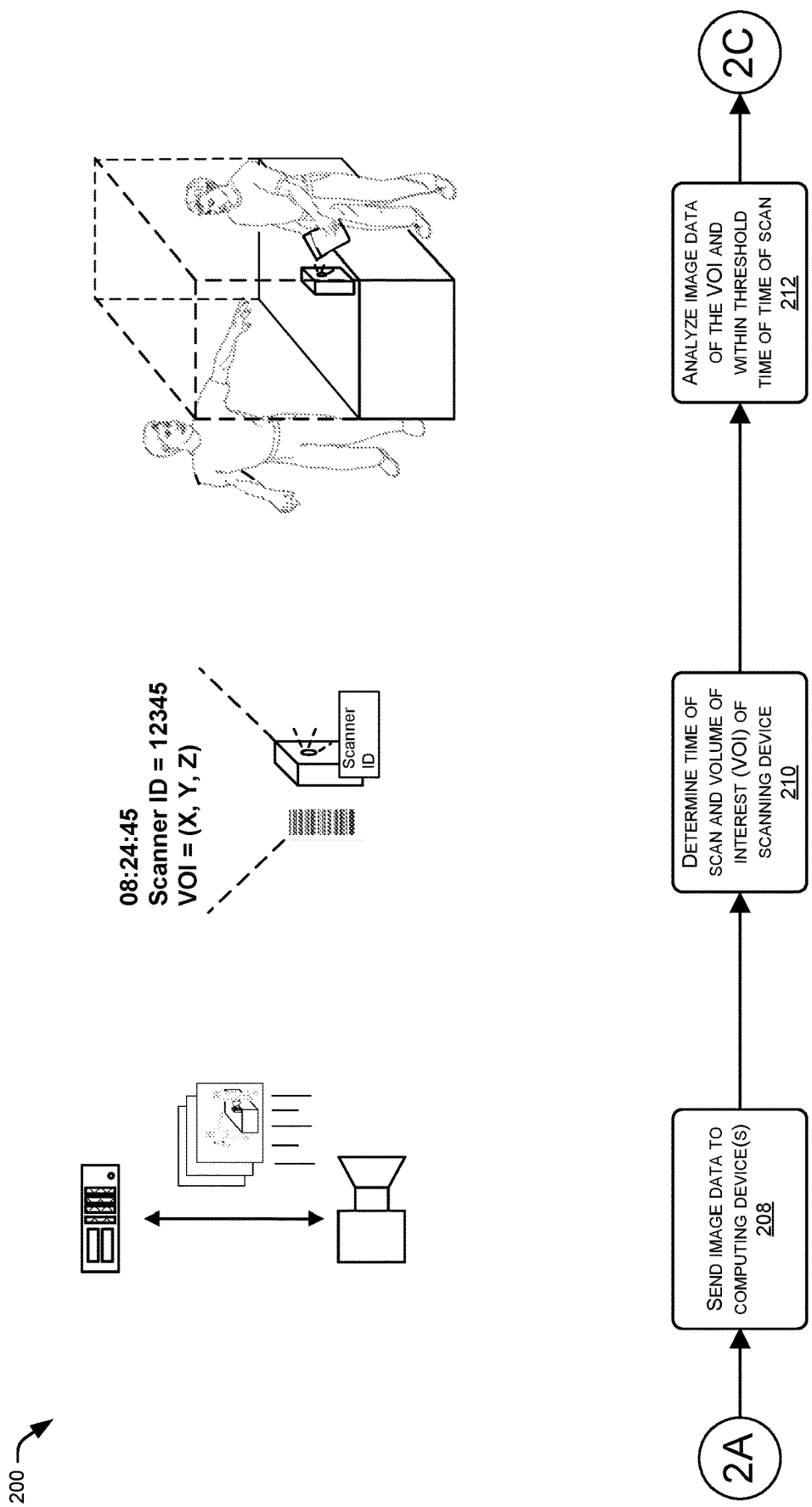
Figure 2C:
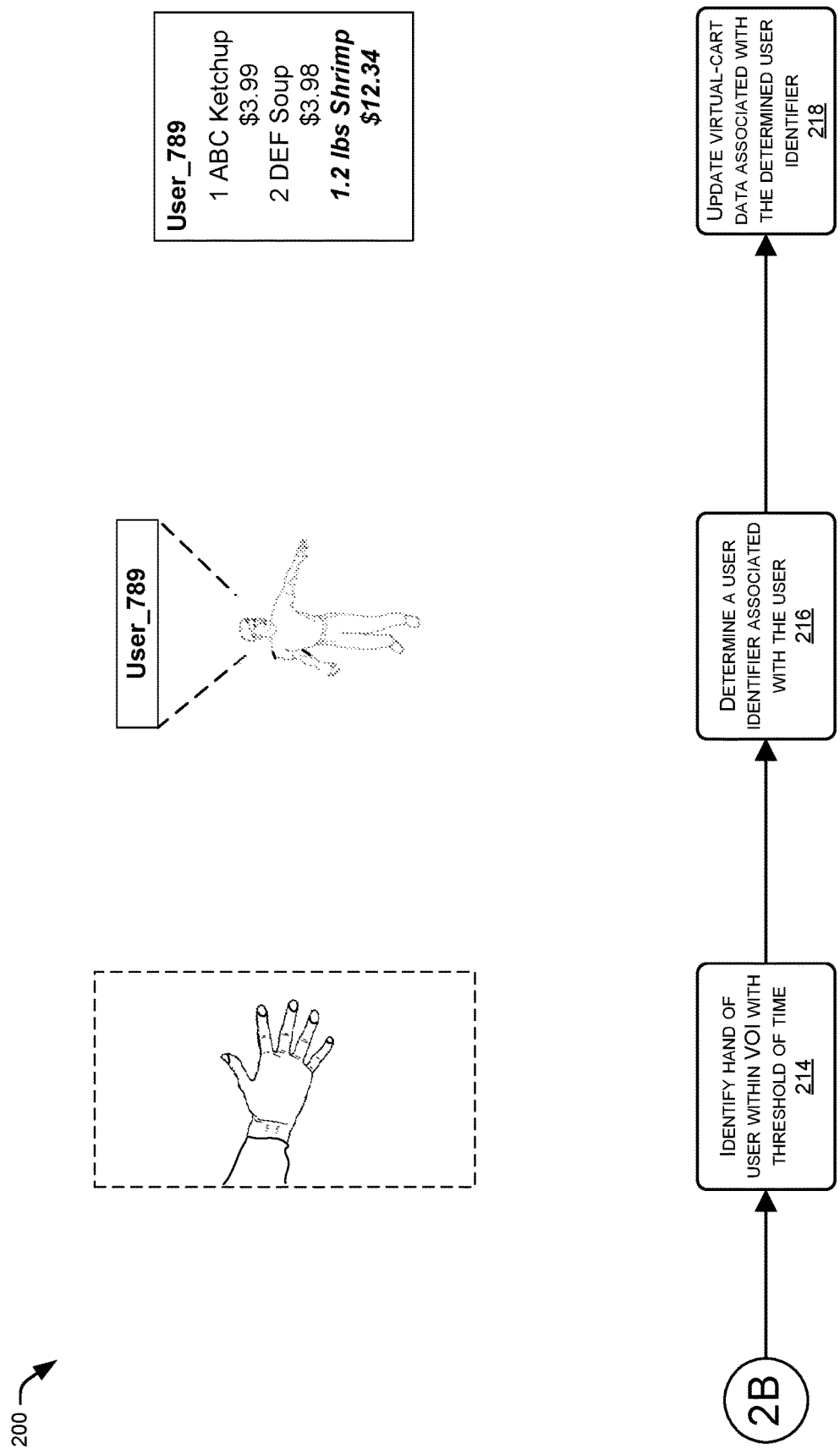

FIGS. 2A-C collectively illustrates an example sequence of operations 200 in which the first user 102 discussed above in FIG. 1 scans the item 104 and hands the item 104 to the second user 110, while the server computing devices 118 analyze image data of the environment near the interaction at the time of the scan to determine a user identifier associated with the second user 110 that received the item.

To begin, the second user 110 or another user may request a particular item, such a certain amount of food, a certain length of fabric, a salad with certain toppings, and/or the like. In response, the first user may prepare the customized item and may print or otherwise generate a physical or digital visual indicia associated with the item, such as a barcode, QR code, or the like. In some instances, the visual indicia may be encode information regarding the item, such as the item identifier, a weight of the item, a length of the item, an amount of the item, a cost of the item, a time at which the item was ordered at a time at which the visual indicia was created, and/or the like. The first user 102 may affix the visual indicia to the item when the visual indicia is physical, or may otherwise associate the visual indicia with the item when the visual indicia is digital or physical.

After the visual indicia has been affixed or otherwise associated with the item 104, an operation 202 represents scanning the item 104 using a scanning device to generate scan data. For example, the first user 102 may scan the visual indicia using any type of scanning device to generate the scan data. As noted above, a system that is to receive the indication of the scan data may store an association between the particular scanning device and a location within the environment. For example, the system may store an association between a particular VOI and each particular scanning device.

An operation 204 represents sending the scan data to one or more computing devices, such as the server computing devices 118 described above. In some instances, the scan data includes or is accompanied by additional information, such as an identifier of the scanning device, a time of the scan, and/or the like.

An operation 206 represents generating image data using cameras in the environment. As will be appreciated, in some instances, the cameras may continuously generate this image data for identifying of events including, and in addition to, the item that was scanned at the operation 202.

FIG. 2B continues the illustration of the sequence of operations 200 and includes, at an operation 208, sending the generated image data to the one or more computing devices, such as the server computing devices 118. In some instances, the cameras continually send this image data to the computing devices, which may analyze the image data to identify events that occur within the environment.

An operation 210 represents the computing device(s) that receive the scan data determining, from the scan data, a time associated with the scan and a VOI associated with the scanning device. For example, this operation may include reading a timestamp of the scan from the scan data and determining, by using an identifier of the scanning device as a key, a VOI associated with the scanning device as stored in the facility data. The computing device(s) may then define a spatiotemporal window using the time of the scan and the VOL. For example, and as described above, the spatiotemporal window may comprise the VOI in terms of the spatial portion of the window and a time range for a predefined amount of time (e.g., 10 seconds, 30 seconds, 2 minutes, etc.) in terms of the time portion of the window. This spatiotemporal window may be used to analyze image data for identifying a hand of a user obtaining the item after the scan.

An operation 212 represents analyzing the VOI from the image data during a threshold amount of time after the time of the scan. For example, this operation may comprise generating feature data associated with the image data and inputting the feature data into a trained classifier that is configured to identify a hand of the user and a state of the hand of the user (e.g., full or empty).

FIG. 2C concludes the illustration of the sequence of operations 200 and includes, at an operation 214, identifying a hand of a user within the VOI within the threshold amount of time from the time of the scan. In some instances, this operation comprises the trained classifier outputting an indication that a hand has been identified in a frame of the image data having a timestamp that is within the defined time range of the spatiotemporal window. In other instances, this operation may comprise identifying at least one frame within the spatiotemporal window in which the classifier identified an empty hand and at least one subsequent frame within the spatiotemporal window in which the classifier identified a full hand. In yet other examples, this operation may comprise generating a motion vector of an identified hand across frames and identifying an empty hand going towards and further into the VOI and a full hand going away and out of the VOI.

An operation 216 represents determining a user identifier associated with the user that is associated with the identified hand. In some instances, this operation may comprise accessing the user data generated by the locating component for determining which user identifier was near or at the location of the scanning device and/or VOI during the time of the scan or during the time range defined by the scan.

An operation 218 represents updating virtual-cart data associated with the user identifier to indicate addition of the item. In the illustrated example, for instance, the virtual cart of the user is updated to include addition of "1.2 lbs of Shrimp" at a cost of $12.34. While this example describes adding an item identifier to the virtual cart, in instances where a user gives back an item that is less scanned, an item identifier may be correspondingly removed from the virtual cart. In these examples, the spatiotemporal window triggered by an item scan may be defined both before and after the scan, and the image data generated prior to the scan may be analyzed to identify the return, such as identifying a full hand of the going into the VOI and an empty hand of the user coming out of the VOI.

FIG. 3A illustrates an image-analysis component 128 using machine-vision algorithms to generate a segmentation map 300 for a frame of image data. As illustrated, the segmentation map 300 may indicate pixels that are associated with different objects, such as background, a hand of a user, an item, and the like. For example, the illustrated segmentation map 300 indicates that different areas of the frame of image data have been associated with example semantic labels (e.g., "labels") using, for example, one or more trained classifiers 302 of the image-analysis component 128. In this example, the semantic labels include background 304, head 306, body 308, arm 310, hand 312, and item (or item in hand) 314, and door 316. Of course, it is to be appreciated that these are merely examples and that any other type of semantic label may be used. It is also noted that a classifier used to generate this example segmentation map 302 may be trained by employing human users to use computer-graphics tools to assign the respective semantic labels 304-316 to the different regions of the frame. After one or more of the human users assign these semantic labels to a threshold amount of image data, the classifier may be trained to apply the semantic labels to still additional image data.

In some instances, a first trained classifier of the classifiers 302 outputs, on a frame-by-frame basis, a segmentation map 300 indicating certain parts of a body (e.g., hand, lower arm, upper arm, head, etc.) and a location of these respective parts. In some instances, this first trained classifier may output a score indicating a likelihood that a particular portion of the frame of image data represents a hand, in addition to a contour of the candidate hand. The first classifier may also associate each identified hand with an identified head in the image data. This head may be used to determine a user identifier of the user and, thus, the each hand may be associated with a user identifier.

FIG. 3B illustrates the image-analysis component 128 using segmentation maps 300 and one or more trained classifiers 302 to determine, for individual frames of image data, whether the frame includes a hand and, if so, a location of the hand and whether it is empty or full. The image-analysis component 128 may use this information to identify a user that acquires an item after it has been scanned using a scanning device. For instance, the illustrated frames in this example may correspond to frames of the image data of the VOI 114 that are associated with timestamps that are within the predefined time range of the spatiotemporal window.

As illustrated, the image-analysis component analyzes a first frame 318(1). In this example, the first classifier described above does not identify a hand. The first classifier, however, does identify an empty hand in a subsequent frame 318(2). For example, and as described above, the classifier may output a score indicative of a presence of a hand, a score indicative of whether an identified hand is empty or full, and a location of the identified hand. In addition, the classifier may associate the hand with a head, as well as with a user identifier that is associated with the head.

A third example frame 318(3) is determined, by the classifier, to represent yet another empty hand, while fourth 318(4) and 318(5) frame are each determined, by the classifier to represent a full hand. In addition, the image-analysis component 128 may use the respective user identifiers and locations of the identified hands across the frames to generate one or more motion vectors associated with the hand. For example, the image-analysis component may use the user identifier associated with a hand to identify the motion of the same hand over time. As illustrated, in this example, the image-analysis component 128 may identify a motion vector indicating that an empty hand moved into the VOI and a full hand moved away and/or out of the VOL. The classifier 302 or another classifier may use this information to make a determination that a user associated with the hand did indeed take the scanned item.

Figure 4A:
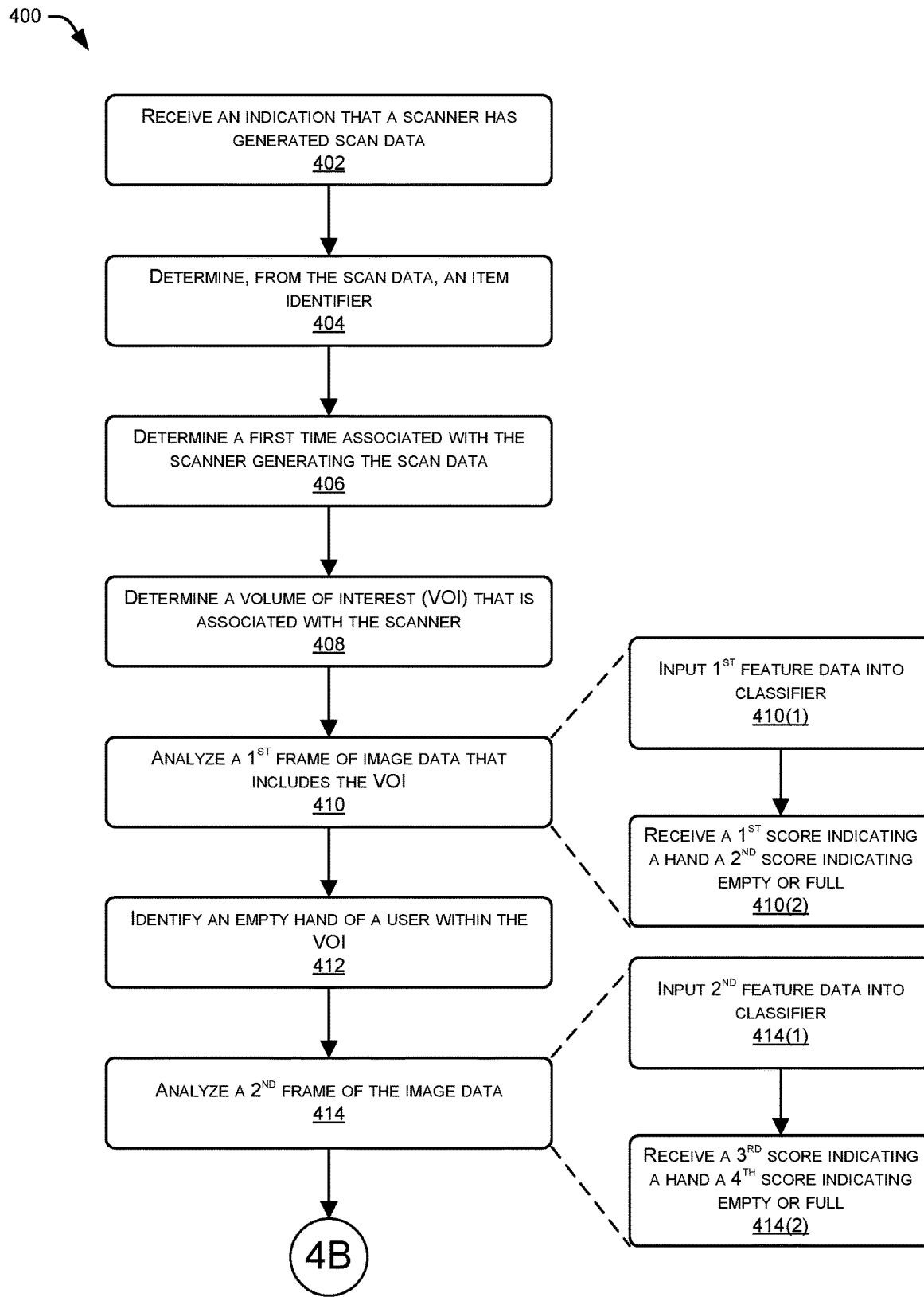
FIGS. 4A-B collectively illustrate a flow diagram of an example process for updating virtual-cart data of a user that receives an item having been scanned, using a scanning device, by another user.
Figure 4B:
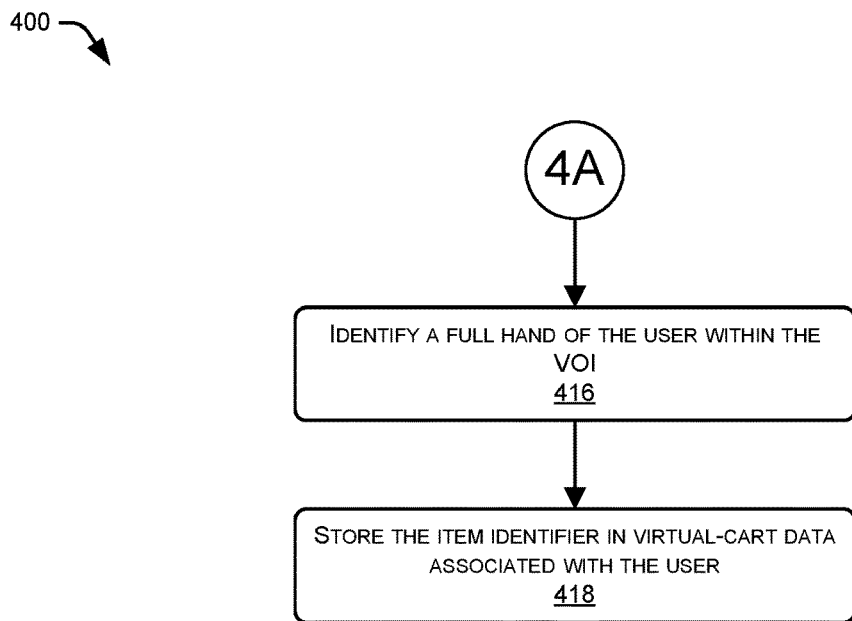

FIGS. 4A-B collectively illustrate a flow diagram of an example process 400 for updating virtual-cart data of a user that receives an item having been scanned, using a scanning device, by another user. The process 400, and other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by a tote (e.g., cart, basket, bag, etc.), servers, other computing devices, or a combination thereof.

An operation 402 represents receiving an indication that a scanner has generated scan data. For example, the event-determination component 130 may receive an indication that a particular scanning device in an environment has scanned visual indicia associated with an item, such as a barcode, a QR code, or the like.

At an operation 404, the event-determination component 130, or another component, may determine an item identifier associated with the scanned item. For example, the event-determination component 130, or another component, may use the scan data to identify a barcode or the like of the scanned item. In some instances, this operation may occur in response to receiving the scan data, while in other instances this operation may occur in response to a different trigger, such as a user that has been designated as a candidate user for an event associated with the scan data exiting the environment. Thus, this operation may occur after subsequent operations described below, in some instances.

An operation 406 represents determining a first time associated with the scanner generating the scan data. This first time may comprise the time at which the scanner generated the scan data, the time as which the scanner sent the scan data, the time at which the computing devices received the scan data, and/or the like.

At an operation 408, the image-analysis component 128, or another component, may determine a volume of interest (VOI) associated with the scanning device. For example, as noted above, the system may store an association between each scanning device within a facility and a respective VOI (e.g., a three-dimensional space of the facility). The image-analysis component may determine an identifier of the scanning device, which may be included in or have been accompanied by the scan data, and may use this scanning-device identifier to determine a corresponding VOI.

An operation 410 represents analyzing a first frame of image data that includes the VOL. For example, this operation may include the image-analysis component 128, or another component, identifying a camera whose FOV includes the VOI (e.g., by accessing a datastore that stores an association between the respective cameras and VOIs) and receiving the image data from this camera generated proximate to the first time determined at the operation 406. For example, the image-analysis component 128 may receive image data generated by the camera during a time range beginning at, before, or just after the first time.

Further, this operation may include analyzing the portion of the image data corresponding to the VOI to determine whether this portion of the image data includes a hand. For example, the operation 410 may include a sub-operation 410(1), in which feature data generated from the image data is input to a classifier. At a sub-operation 410(2), the classifier may output a first score indicating whether the image data includes a hand and a second score indicating whether the hand is empty or full. In some instances, analyzing the image data comprises a two-step process as described above: first, segmenting each frame of the image data into different predefined objects, including a hand and head of the user, and second tracking motion of any identified hand across frames. For example, a first classifier may generate a segmentation map identifying at least one hand and a corresponding head, the latter of which may be used to determine a user identifier of the user. This segmentation information may be output by the first classifier and input, for example, into a hand-tracking component for tracking each hand across frames.

At an operation 412, in this example the image-analysis component 128, or another component, identifies an empty hand of a user within the VOL. For example, the image-analysis component 128, or another component, determines, using one or more classifiers, that an empty hand is present within the VOI after the first time associated with the scan data.

An operation 414 represents the image-analysis component 128, or another component, analyzing a second frame of the image data that includes the VOI, with the second frame corresponding to a time that is subsequent to a time associated with the first frame. Again, this operation may include a sub-operation 414(1), in which feature data generated from the second frame of the image data is input to a classifier. At a sub-operation 414(2), the classifier may output a third score indicating whether the image data includes a hand and a fourth score indicating whether the hand is empty or full.

FIG. 4B continues the illustration of the process 400 and includes, at an operation 416, identifying a full hand of the user based on the analyzing of the second frame at the operation 414. For example, this operation may comprise receiving an indication from a classifier that the second frame of the image data represents a full hand of a user within the VOL. In some instances, this indication may also indicate that the full hand is associated with a same user identifier as the empty hand identified at the operation 412.

Finally, an operation 418 represents storing the item identifier associated with the item in virtual-cart data associated with a user that is associated with the user identifier. For example, the virtual-cart component 132, or another component, may update the appropriate user cart to indicate the addition of the item.

In some instances, the operation 418 may occur in response to determining that a hand of the user entered the VOI empty and exited the VOI full. In other instances, meanwhile, the operation 418 may occur in response to identifying the hand of the user in the VOI within a time range defined by the first time, in response to identifying a full hand of the user in the VOI within the time range, or the like. For example, in some instances, the virtual cart of a user may be updated in response to identifying a hand of the user in the event that a single hand is identified during the time range. However, if multiple hands (corresponding to different user identifiers) are identified within the VOI during the time range, then the virtual cart of a particular user may be updated in response to identifying an empty hand of the user and, thereafter, a full hand of the user.

Figure 5:
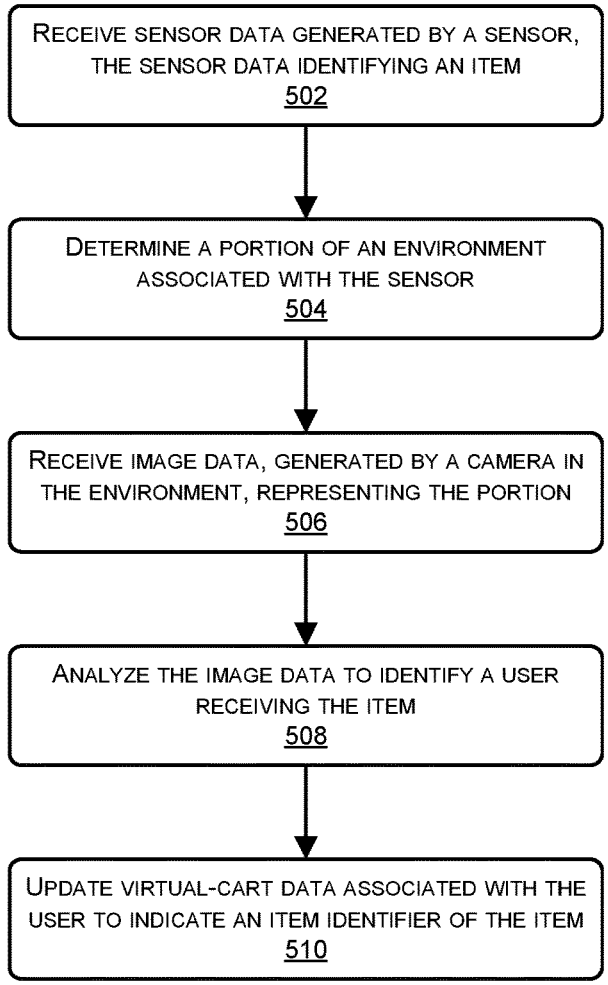
FIG. 5 illustrates a flow diagram of another example process for updating virtual-cart data of a user that receives an item.

FIG. 5 illustrates a flow diagram of another example process 500 for updating virtual-cart data of a user that receives an item. An operation 502 represents receiving sensor data generated by a sensor in an environment, the sensor data identifying an item. In some instances, the sensor may comprise a scanning device that generates scan data in response to scanning visual indicia associated with an item.

An operation 504 represents determining a portion of the environment associated with the sensor. As described above, determining this portion of the environment may comprise determining a volume of interest (VOI) within the environment and determined relative to the sensor. In some instances, a datastore of the described system may store an association between a scanning device and a VOI, an association between the scanning device and a camera having an FOV of the VOI, and/or the like.

An operation 506 represents receiving image data generated by a camera within the environment, the image data representing the portion of the environment of the associated with the sensor. For example, this operation may comprise receiving image data from the camera having the FOV of the VOL. In some instances, the scan data may indicate a first time associated with the sensor data (e.g., a time at which the sensor generated the sensor data) and, thus, the receiving of the image data may comprise receiving image data from the appropriate camera during a time range that is based on the first time.

An operation 508 represents analyzing the image data to identify a user receiving the item. In some instances, this operation may comprise analyzing the image data generated by the camera after the time and within a threshold amount of time of the first time. Further, the analyzing may comprise analyzing at least a portion of the image data corresponding to the VOI to identify a hand of the user within the VOL. Further, this may comprise analyzing the image data to at least identify, from a first frame of the image data, an empty hand of the user within the VOI and to identify, from a second frame of the image data, a full hand of the user within the VOL. In still other instances, this analyzing may comprise analyzing at least a portion of a first frame of the image data corresponding to the VOI to identify an empty hand of the user at a first location within the VOI, analyzing at least a portion of a second frame of the image data corresponding to the VOI to identify the empty hand of the user at a second location within the VOI determining a first direction vector based at least in part on the first location and the second location, analyzing a least a portion of a third frame of the image data corresponding to the VOI to identify a full hand of the user at a third location within the VOI, analyzing a least a portion of a fourth frame of the image data corresponding to the VOI to identify the full hand of the user at a fourth location within the VOI, and determining a second direction vector based at least in part on the third location and the fourth location. That is, analyzing the image data to identify the user receiving the item may comprise, in some instances, determining that an empty hand of the user went into the VOI and a full hand of the user left the VOI.

Furthermore, and as described above, analyzing the image data may comprise generating a segmentation map for identifying one or more hands within the VOI and using this information for determining a user that received the item. For example, this operation may comprise generating a segmentation map using a first frame of the image data, the segmentation map at least identifies a first set of pixels of the first frame corresponding to a hand of the user, inputting, into a trained classifier, first data indicating the first set of pixels of the first frame corresponding to the hand of the user, and receiving, as output of the trained classifier, second data indicating whether the user received the item. Further, in some instances, an item may be identified and tracked within the VOI in addition to a hand of a user. In these instances, the item may be identified within frames of the image data and tracked across frames to identify the item being placed into a hand of the user. In each of the examples described herein, the hand of the user may receive the item from a hand of another user (e.g., an associate of a facility), from a counter on which another user placed the item, and/or in any other manner.

Finally, an operation 510 represents updating virtual-cart data associated with the user to indicate an item identifier associated with the item. This operation may include adding information regarding the item to the appropriate virtual cart, such as the item identifier, a cost of the item, a description of the item, a time at which the user received the item, and/or the like.

Figure 6:
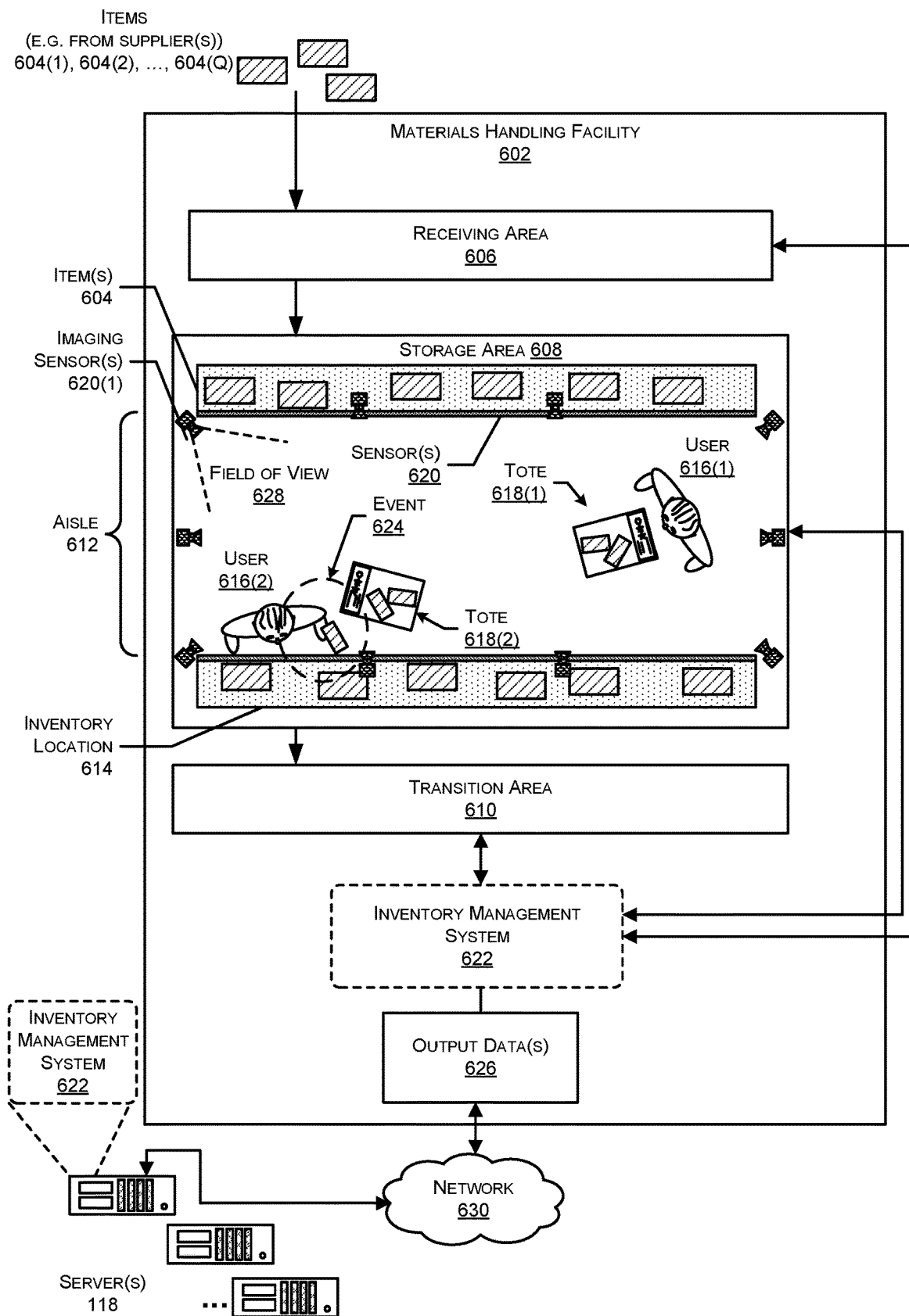
FIG. 6 is a block diagram of an example materials handling facility that includes sensors and an inventory management system configured to generate output regarding events occurring in the facility using the sensor data.

FIG. 6 is a block diagram of an example materials handling facility 602 that includes sensors and an inventory management system configured to generate output regarding events occurring in the facility using the sensor data. In some instances, the facility 602 corresponds to the architecture 100 and/or the environment 106 described above.

However, the following description is merely one illustrative example of an industry and environment in which the techniques described herein may be utilized. The materials handling facility 602 (or "facility") comprises one or more physical structures or areas within which one or more items 604(1), 604(2), . . . , 604(Q) (generally denoted as 604) may be held. As used in this disclosure, letters in parenthesis such as "(Q)" indicate an integer result. The items 604 comprise physical goods, such as books, pharmaceuticals, repair parts, electronic gear, groceries, and so forth.

The facility 602 may include one or more areas designated for different functions with regard to inventory handling. In this illustration, the facility 602 includes a receiving area 606, a storage area 608, and a transition area 610. The receiving area 606 may be configured to accept items 604, such as from suppliers, for intake into the facility 602. For example, the receiving area 606 may include a loading dock at which trucks or other freight conveyances unload the items 604.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of shelves, racks, cases, cabinets, bins, floor locations, or other suitable storage mechanisms for holding or storing the items 604. The inventory locations 614 may be affixed to the floor or another portion of the facility's structure, or may be movable such that the arrangements of aisles 612 may be reconfigurable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2), . . . , 616(U), totes 618(1), 618(2), . . . , 618(T) (generally denoted as 618) or other material handling apparatus may move within the facility 602. For example, the users 616 may move about within the facility 602 to pick or place the items 604 in various inventory locations 614, placing them on the totes 618 for ease of transport. An individual tote 618 is configured to carry or otherwise transport one or more items 604. For example, a tote 618 may include a basket, a cart, a bag, and so forth. In other implementations, other agencies such as robots, forklifts, cranes, aerial drones, and so forth, may move about the facility 602 picking, placing, or otherwise moving the items 604.

One or more sensors 620 may be configured to acquire information in the facility 602. The sensors 620 in the facility 602 may include sensors fixed in the environment (e.g., ceiling-mounted cameras) or otherwise, such as sensors in the possession of users (e.g., mobile phones, tablets, etc.). The sensors 620 may include, but are not limited to, cameras 620(1), weight sensors, radio frequency (RF) receivers, temperature sensors, humidity sensors, vibration sensors, and so forth. The sensors 620 may be stationary or mobile, relative to the facility 602. For example, the inventory locations 614 may contain cameras 620(1) configured to acquire images of pick or placement of items 604 on shelves, of the users 616(1) and 616(2) in the facility 602, and so forth. In another example, the floor of the facility 602 may include weight sensors configured to determine a weight of the users 616 or other object thereupon.

During operation of the facility 602, the sensors 620 may be configured to provide information suitable for tracking how objects move or other occurrences within the facility 602. For example, a series of images acquired by a camera 620(1) may indicate removal of an item 604 from a particular inventory location 614 by one of the users 616 and placement of the item 604 on or at least partially within one of the totes 618.

While the storage area 608 is depicted as having one or more aisles 612, inventory locations 614 storing the items 604, sensors 620, and so forth, it is understood that the receiving area 606, the transition area 610, or other areas of the facility 602 may be similarly equipped. Furthermore, the arrangement of the various areas within the facility 602 is depicted functionally rather than schematically. For example, multiple different receiving areas 606, storage areas 608, and transition areas 610 may be interspersed rather than segregated in the facility 602.

The facility 602 may include, or be coupled to, an inventory management system 622, which may perform some or all of the techniques described above with reference to FIGS. 1-5. As described below, the inventory management system 622 may include the components of the servers 118 illustrated in claim 1 and described above with reference to FGIS. 1-5. For example, the inventory management system may maintain a virtual cart of each user within the facility. The inventory management system may also store a record associated with each user indicating the identity of the user, the location of the user, and whether the user is eligible to exit the facility with one or more items without performing a manual checkout of the items. The inventory management system may also generate and output notification data to the users, indicating whether or not they are so eligible.

As illustrated, the inventory management system 622 may reside at the facility 602 (e.g., as part of on-premises servers), on the servers 118 that are remote from the facility 602, a combination thereof. In each instance, the inventory management system 622 is configured to identify interactions and events with and between users 616, devices such as sensors 620, robots, material handling equipment, computing devices, and so forth, in one or more of the receiving area 606, the storage area 608, or the transition area 610. As described above, some interactions may further indicate the existence of one or more events 624—or predefined activities of interest. For example, events 624 may include the entry of the user 616 to the facility 602, stocking of items 604 at an inventory location 614, picking of an item 604 from an inventory location 614, returning of an item 604 to an inventory location 614, placement of an item 604 within a tote 618, movement of users 616 relative to one another, gestures by the users 616, and so forth. Other events 624 involving users 616 may include the user 616 providing authentication information in the facility 602, using a computing device at the facility 602 to authenticate identity to the inventory management system 622, and so forth. Some events 624 may involve one or more other objects within the facility 602. For example, the event 624 may comprise movement within the facility 602 of an inventory location 614, such as a counter mounted on wheels. Events 624 may involve one or more of the sensors 620. For example, a change in operation of a sensor 620, such as a sensor failure, change in alignment, and so forth, may be designated as an event 624. Continuing the example, movement of a camera 620(1) resulting in a change in the orientation of the field of view 628 (such as resulting from someone or something bumping the camera 620(1)) (e.g. camera 104) may be designated as an event 624.

By determining the occurrence of one or more of the events 624, the inventory management system 622 may generate output data 626. The output data 626 comprises information about the event 624. For example, where the event 624 comprises an item 604 being removed from an inventory location 614, the output data 626 may comprise an item identifier indicative of the particular item 604 that was removed from the inventory location 614 and a user identifier of a user that removed the item.

The inventory management system 622 may use one or more automated systems to generate the output data 626. For example, an artificial neural network, one or more classifiers, or other automated machine learning techniques may be used to process the sensor data from the one or more sensors 620 to generate output data 626. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 626 or the tentative results. The automated systems may generate confidence level data that provides information indicative of the accuracy or confidence that the output data 626 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 604, user 616, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 616 may pick an item 604(1) such as a perfume bottle that is generally cubical in shape from the inventory location 614. Other items 604 at nearby inventory locations 614 may be predominately spherical. Based on the difference in shape (cube vs. sphere) from the adjacent items, and the correspondence in shape with the previously stored image of the perfume bottle item 604(1) (cubical and cubical), the confidence level that the user 106 has picked up the perfume bottle item 604(1) is high.

In some situations, the automated techniques may be unable to generate output data 626 with a confidence level above a threshold result. For example, the automated techniques may be unable to distinguish which user 616 in a crowd of users 616 has picked up the item 604 from the inventory location 614. In other situations, it may be desirable to provide human confirmation of the event 624 or of the accuracy of the output data 626. For example, some items 604 may be deemed age restricted such that they are to be handled only by users 616 above a minimum age threshold.

In instances where human confirmation is desired, sensor data associated with an event 624 may be processed to generate inquiry data. The inquiry data may include a subset of the sensor data associated with the event 624. The inquiry data may also include one or more of one or more tentative results as determined by the automated techniques, or supplemental data. The subset of the sensor data may be determined using information about the one or more sensors 620. For example, camera data such as the location of the camera 620(1) within the facility 602, the orientation of the camera 620(1), and a field of view 628 of the camera 620(1) may be used to determine if a particular location within the facility 602 is within the field of view 628. The subset of the sensor data may include images that may show the inventory location 614 or that the item 604 was stowed. The subset of the sensor data may also omit images from other cameras 620(1) that did not have that inventory location 614 in the field of view 628. The field of view 628 may comprise a portion of the scene in the facility 602 that the sensor 620 is able to generate sensor data about.

Continuing the example, the subset of the sensor data may comprise a video clip acquired by one or more cameras 620(1) having a field of view 628 that includes the item 604. The tentative results may comprise the "best guess" as to which items 604 may have been involved in the event 624. For example, the tentative results may comprise results determined by the automated system that have a confidence level above a minimum threshold.

The facility 602 may be configured to receive different kinds of items 604 from various suppliers and to store them until a customer orders or retrieves one or more of the items 604. A general flow of items 604 through the facility 602 is indicated by the arrows of FIG. 2. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602. The receiving of the items 604 may comprise one or more events 624 for which the inventory management system 622 may generate output data 626.

Upon being received from a supplier at receiving area 606, the items 604 may be prepared for storage. For example, items 604 may be unpacked or otherwise rearranged. The inventory management system 622 may include one or more software applications executing on a computer system to provide inventory management functions based on the events 624 associated with the unpacking or rearrangement. These inventory management functions may include maintaining information indicative of the type, quantity, condition, cost, location, weight, or any other suitable parameters with respect to the items 604. The items 604 may be stocked, managed, or dispensed in terms of countable, individual units or multiples, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in bins, on shelves, hanging from pegboards, and so forth. In this implementation, all items 604 of a given kind are stored in one inventory location 614. In other implementations, like items 604 may be stored in different inventory locations 614. For example, to optimize retrieval of certain items 604 having frequent turnover within a large physical facility 602, those items 604 may be stored in several different inventory locations 614 to reduce congestion that might occur at a single inventory location 614. Storage of the items 604 and their respective inventory locations 614 may comprise one or more events 624.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608, and placing those items 604 into a tote 618. In other implementations, employees of the facility 602 may pick items 604 using written or electronic pick lists derived from customer orders. These picked items 604 may be placed into the tote 618 as the employee progresses through the facility 602. Picking may comprise one or more events 624, such as the user 616 in moving to the inventory location 614, retrieval of the item 604 from the inventory location 614, and so forth.

After items 604 have been picked, they may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. The transitioning may comprise one or more events 624. Information about the transition may be maintained by the inventory management system 622 using the output data 626 associated with those events 624.

In another example, if the items 604 are departing the facility 602 a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a customer may purchase or rent the items 604 and remove the items 604 from the facility 602. The purchase or rental may comprise one or more events 624.

The inventory management system 622 may access or generate sensor data about the facility 602 and the contents therein including the items 604, the users 616, the totes 618, and so forth. The sensor data may be acquired by one or more of the sensors 620, data provided by other systems, and so forth. For example, the sensors 620 may include cameras 620(1) configured to acquire image data of scenes in the facility 602. The image data may comprise still images, video, or a combination thereof. The image data may be processed by the inventory management system 622 to determine a location of the user 616, the tote 618, the identity of the user 616, and so forth. As used herein, the identity of the user may represent a unique identifier of the user (e.g., name, number associated with user, username, etc.), an identifier that distinguishes the user amongst other users being located with the environment, or the like.

The inventory management system 622, or systems coupled thereto, may be configured to identify the user 616, as well as to determine other candidate users. In one implementation, this determination may comprise comparing sensor data with previously stored identity data. For example, the user 616 may be identified by showing their face to a facial recognition system, by presenting a token carrying authentication credentials, providing a fingerprint, scanning a barcode or other type of unique identifier upon entering the facility, and so forth. Identity of the user 616 may be determined before, during, or after entry to the facility 602. Determination of the user's 616 identity may comprise comparing sensor data associated with the user 616 in the facility 602 to previously stored user data.

In some instances, the inventory management system group users within the facility into respective sessions. That is, the inventory management system 622 may utilize the sensor data to determine groups of users that are effectively "together" (e.g., shopping together). In some instances, a particular session may include multiple users that entered the facility 602 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 618. Noting the child and the mother as belonging to the same session may increase the chances of successfully adding the box of cereal to the virtual shopping cart of the mother.

By determining the occurrence of one or more events 624 and the output data 626 associated therewith, the inventory management system 622 is able to provide one or more services to the users 616 of the facility 602. By utilizing one or more human associates to process inquiry data and generate response data that may then be used to produce output data 626, overall accuracy of the system may be enhanced. The enhanced accuracy may improve the user experience of the one or more users 616 of the facility 602. In some examples, the output data 626 may be transmitted over a network 630 to one or more servers 118.

Figure 7:
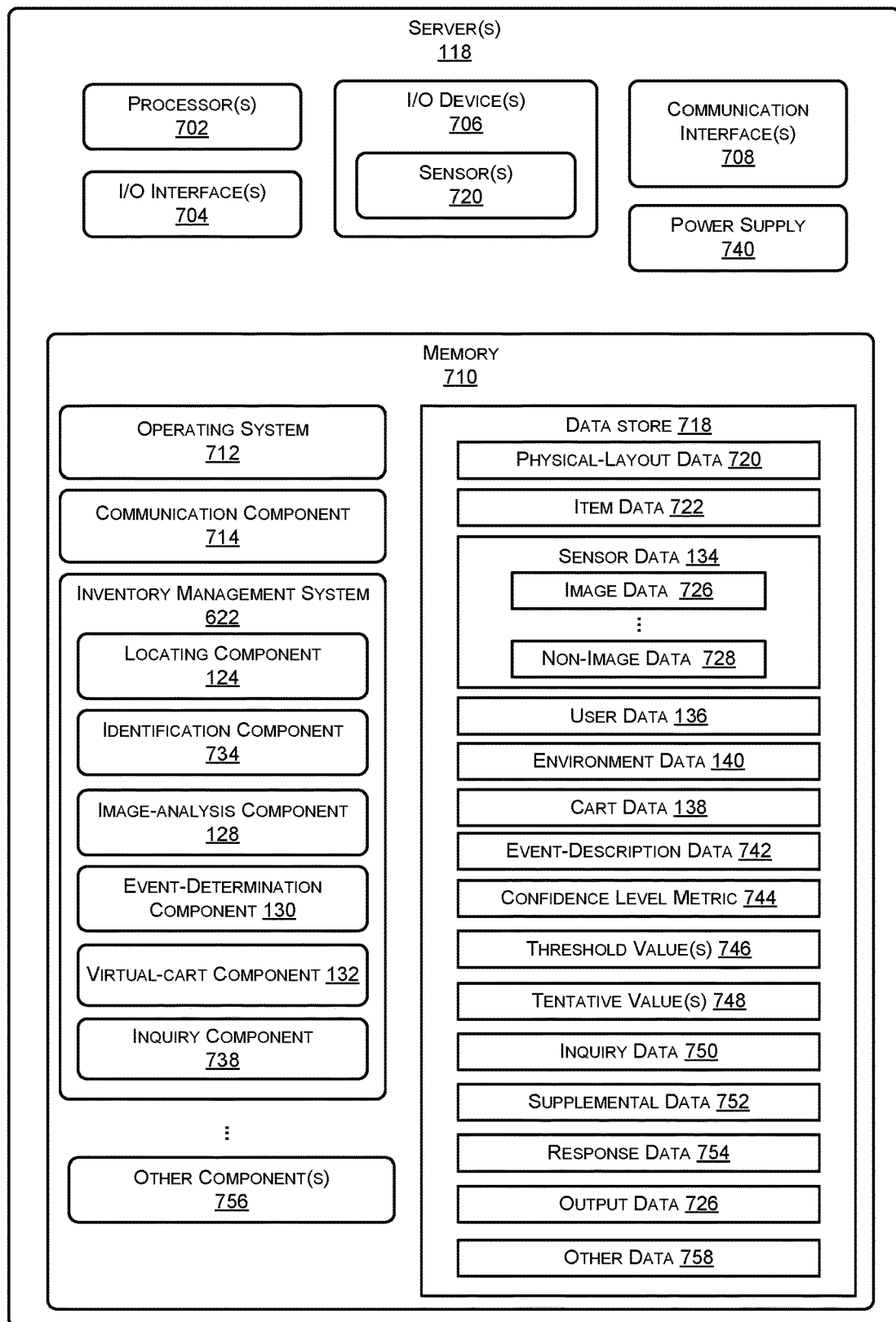
FIG. 7 illustrates a block diagram of one or more servers configured to support operation of the facility.

FIG. 7 illustrates a block diagram of one or more servers 118 configured to support operation of the facility. The servers 118 may be physically present at the facility 602, may be accessible by the network 630, or a combination of both. The servers 118 do not require end-user knowledge of the physical location and configuration of the system that delivers the services. Common expressions associated with the servers 118 may include "on-demand computing," "software as a service (SaaS)," "cloud services," "data centers," and so forth. Services provided by the servers 118 may be distributed across one or more physical or virtual devices.

The servers 118 may include one or more hardware processors 702 (processors) configured to execute one or more stored instructions. The processors 702 may comprise one or more cores. The servers 118 may include one or more input/output (I/O) interface(s) 704 to allow the processor 702 or other portions of the servers 118 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth.

The servers 118 may also include one or more communication interfaces 706. The communication interfaces 706 are configured to provide communications between the servers 118 and other devices, such as the sensors 620, the interface devices, routers, and so forth. The communication interfaces 706 may include devices configured to couple to personal area networks (PANs), wired and wireless local area networks (LANs), wired and wireless wide area networks (WANs), and so forth. For example, the communication interfaces 706 may include devices compatible with Ethernet, Wi-Fi™, and so forth. The servers 118 may also include one or more busses or other internal communications hardware or software that allow for the transfer of data between the various modules and components of the servers 118.

The servers 118 may also include a power supply 740. The power supply 740 is configured to provide electrical power suitable for operating the components in the servers 118.

The servers 118 may further include one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the servers 118. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interfaces 704, the communication interfaces 708, and provide various services to applications or components executing on the processors 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 710. These components may be executed as foreground applications, background tasks, daemons, and so forth. A communication component 714 may be configured to establish communications with one or more of the sensors 620, one or more of the devices used by associates, other servers 118, or other devices. The communications may be authenticated, encrypted, and so forth.

The memory 710 may store the inventory management system 622. The inventory management system 622 is configured to provide some or all of the techniques described above with reference to FIGS. 1-5. For example, the inventory management system 622 may include components to receive scan data, determine an event that happened with respect to the scanned item, update a virtual cart of a user, and so forth.

The inventory management system 622 may access information stored in one or more data stores 718 in the memory 710. The data store 718 may use a flat file, database, linked list, tree, executable code, script, or other data structure to store the information. In some implementations, the data store 718 or a portion of the data store 718 may be distributed across one or more other devices including other servers 118, network attached storage devices, and so forth. The data store 718 may include the datastores described above, such as the user data 136, the environment data 140, the sensor data 134, and the cart data 136.

The data store 718 may also include physical layout data 720. The physical layout data 720 provides a mapping of physical locations within the physical layout of devices and objects such as the sensors 620, inventory locations 614, and so forth. The physical layout data 720 may indicate the coordinates within the facility 602 of an inventory location 614, sensors 620 within view of that inventory location 614, and so forth. For example, the physical layout data 720 may include camera data comprising one or more of a location within the facility 602 of a camera 620(1), orientation of the camera 620(1), the operational status, and so forth. Continuing example, the physical layout data 720 may indicate the coordinates of the camera 620(1), pan and tilt information indicative of a direction that the field of view 628 is oriented along, whether the camera 620(1) is operating or malfunctioning, and so forth.

In some implementations, the inventory management system 622 may access the physical layout data 720 to determine if a location associated with the event 624 is within the field of view 628 of one or more sensors 620. Continuing the example above, given the location within the facility 602 of the event 624 and the camera data, the inventory management system 622 may determine the cameras 620(1) that may have generated images of the event 624.

The item data 722 comprises information associated with the items 604. The information may include information indicative of one or more inventory locations 614 at which one or more of the items 604 are stored. The item data 722 may also include order data, SKU or other product identifier, price, quantity on hand, weight, expiration date, images of the ITEM 604, detail description information, ratings, ranking, and so forth. The inventory management system 622 may store information associated with inventory management functions in the item data 722.

The data store 718 may also include sensor data 134. The sensor data 134 comprises information acquired from, or based on, the one or more sensors 620. For example, the sensor data 134 may comprise 3D information about an object in the facility 602. As described above, the sensors 620 may include a camera 620(1), which is configured to acquire one or more images. These images may be stored as the image data 726. The image data 726 may comprise information descriptive of a plurality of picture elements or pixels. Non-image data 728 may comprise information from other sensors 620, such as input from the microphones, weight sensors, and so forth.

User data 730 may also be stored in the data store 718. The user data 730 may include identity data, information indicative of a profile, purchase history, location data, images of the user 616, demographic data, and so forth. Individual users 616 or groups of users 616 may selectively provide user data 730 for use by the inventory management system 622. The individual users 616 or groups of users 616 may also authorize collection of the user data 730 during use of the facility 602 or access to user data 730 obtained from other systems. For example, the user 616 may opt-in to collection of the user data 730 to receive enhanced services while using the facility 602.

In some implementations, the user data 730 may include information designating a user 616 for special handling. For example, the user data 730 may indicate that a particular user 616 has been associated with an increased number of errors with respect to output data 626. The inventory management system 622 may be configured to use this information to apply additional scrutiny to the events 624 associated with this user 616. For example, events 624 that include an item 604 having a cost or result above the threshold amount may be provided to the associates for processing regardless of the determined level of confidence in the output data 626 as generated by the automated system.

The inventory management system 622 may include one or more of a locating component 124, an identification component 734, an image-analysis component 128, an event-determination component 130, a virtual-cart component 132, an inquiry component 738, potentially amongst other components 756.

The locating component 124 functions to locate items or users within the environment of the facility to allow the inventory management system 622 to assign certain events to the correct users. That is, the locating component 124 may assign unique identifiers to users as they enter the facility and, with the users' consent, may locate the users throughout the facility 602 over the time they remain in the facility 602. The locating component 124 may perform this locating using sensor data 134, such as the image data 726. For example, the locating component 124 may receive the image data 726 and may use facial-recognition techniques to identify users from the images. After identifying a particular user within the facility, the locating component 124 may then locate the user within the images as the user moves throughout the facility 602. Further, should the locating component 124 temporarily "lose" a particular user, the locating component 124 may again attempt to identify the users within the facility based on facial recognition, and/or using other techniques such as voice recognition, or the like.

Therefore, upon receiving the indication of the time and location of the event in question, the locating component 124 may query the data store 718 to determine which one or more users were at or within a threshold distance of the location of the event at the particular time of the event. Further, the locating component 124 may assign different confidence levels to different users, with the confidence levels indicating how likely it is that each corresponding user is the user that is in fact associated with the event of interest.

The locating component 124 may access the sensor data 134 in order to determine this location data of the user and/or items. The location data provides information indicative of a location of an object, such as the item 604, the user 616, the tote 618, and so forth. The location may be absolute with respect to the facility 602 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 602, 5.2 m from an inventory location 614 along a heading of 169°, and so forth. For example, the location data may indicate that the user 616(1) is 25.2 m along the aisle 612(1) and standing in front of the inventory location 614. In comparison, a relative location may indicate that the user 616(1) is 32 cm from the tote 618 at a heading of 730 with respect to the tote 118. The location data may include orientation information, such as which direction the user 616 is facing. The orientation may be determined by the relative direction the user's body is facing. In some implementations, the orientation may be relative to the interface device. Continuing the example, the location data may indicate that the user 616(1) is oriented with a heading of 0°, or looking north. In another example, the location data may indicate that the user 616 is facing towards the interface device.

The identification component 734 is configured to identify an object. In one implementation, the identification component 734 may be configured to identify an item 604. In another implementation, the identification component 734 may be configured to identify the user 616. For example, the identification component 734 may use facial recognition techniques to process the image data 726 and determine the identity data of the user 616 depicted in the images by comparing the characteristics in the image data 726 with previously stored results. The identification component 734 may also access data from other sensors 620, such as from an RFID reader, an RF receiver, fingerprint sensors, and so forth.

The event-determination component 130 is configured to process the sensor data 134 and generate output data 726, using the techniques described above and otherwise. The event-determination component 130 may access information stored in the data store 718 including, but not limited to, event description data 742, confidence levels 744, or threshold values 746. In some instances, the event-determination component 130 may be configured to perform some or all of the techniques described above with regards to the event-determination component 106. For instance, the event-determination component 130 may be configured to create and utilize event classifiers for identifying events (e.g., predefined activity) within image data, potentially without use of other sensor data acquired by other sensors in the environment.

The event description data 742 comprises information indicative of one or more events 624. For example, the event description data 742 may comprise predefined profiles that designate movement of an item 604 from an inventory location 614 with the event 624 of "pick". The event description data 742 may be manually generated or automatically generated. The event description data 742 may include data indicative of triggers associated with events occurring in the facility 602. An event may be determined as occurring upon detection of the trigger. For example, sensor data 134 such as a change in weight from a weight sensor 620(6) at an inventory location 614 may trigger detection of an event of an item 604 being added or removed from the inventory location 614. In another example, the trigger may comprise an image of the user 616 reaching a hand toward the inventory location 614. In yet another example, the trigger may comprise two or more users 616 approaching to within a threshold distance of one another.

The event-determination component 130 may process the sensor data 134 using one or more techniques including, but not limited to, artificial neural networks, classifiers, decision trees, support vector machines, Bayesian networks, and so forth. For example, the event-determination component 130 may use a decision tree to determine occurrence of the "pick" event 624 based on sensor data 134. The event-determination component 130 may further use the sensor data 134 to determine one or more tentative results 748. The one or more tentative results 748 comprise data associated with the event 624. For example, where the event 624 comprises a disambiguation of users 616, the tentative results 748 may comprise a list of possible user 616 identities. In another example, where the event 624 comprises a disambiguation between items 104, the tentative results 748 may comprise a list of possible item identifiers. In some implementations, the tentative result 748 may indicate the possible action. For example, the action may comprise the user 616 picking, placing, moving an item 604, damaging an item 604, providing gestural input, and so forth.

In some implementations, the tentative results 748 may be generated by other components. For example, the tentative results 748 such as one or more possible identities or locations of the user 616 involved in the event 624 may be generated by the locating component 124. In another example, the tentative results 748 such as possible items 604 that may have been involved in the event 624 may be generated by the identification component 734.

The event-determination component 130 may be configured to provide a confidence level 744 associated with the determination of the tentative results 748. The confidence level 744 provides indicia as to the expected level of accuracy of the tentative result 748. For example, a low confidence level 744 may indicate that the tentative result 748 has a low probability of corresponding to the actual circumstances of the event 624. In comparison, a high confidence level 744 may indicate that the tentative result 748 has a high probability of corresponding to the actual circumstances of the event 624.

In some implementations, the tentative results 748 having confidence levels 744 that exceed the threshold may be deemed to be sufficiently accurate and thus may be used as the output data 626. For example, the event-determination component 130 may provide tentative results 748 indicative of the three possible items 604(1), 604(2), and 604(3) corresponding to the "pick" event 624. The confidence levels 744 associated with the possible items 604(1), 604(2), and 604(3) may be 25%, 70%, 92%, respectively. Continuing the example, the threshold result may be set such that confidence level 744 of 90% are deemed to be sufficiently accurate. As a result, the event-determination component 130 may designate the "pick" event 624 as involving item 604(3).

The inquiry component 738 may be configured to use at least a portion of the sensor data 134 associated with the event 624 to generate inquiry data 750. In some implementations, the inquiry data 750 may include one or more of the tentative results 748 or supplemental data 752. The inquiry component 738 may be configured to provide inquiry data 750 to one or more devices associated with one or more human associates.

An associate user interface is presented on the respective devices of associates. The associate may generate response data 754 by selecting a particular tentative result 748, entering new information, indicating that they are unable to answer the inquiry, and so forth.

The supplemental data 752 comprises information associated with the event 624 or that may be useful in interpreting the sensor data 134. For example, the supplemental data 752 may comprise previously stored images of the items 604. In another example, the supplemental data 752 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 738 processes the response data 754 provided by the one or more associates. The processing may include calculating one or more statistical results associated with the response data 754. For example, statistical results may include a count of the number of times associates selected a particular tentative result 748, determination of a percentage of the associates that selected a particular tentative result 748, and so forth.

The inquiry component 738 is configured to generate the output data 626 based at least in part on the response data 754. For example, given that a majority of the associates returned response data 754 indicating that the item 604 associated with the "pick" event 624 is item 604(5), the output data 626 may indicate that the item 604(5) was picked.

The inquiry component 738 may be configured to selectively distribute inquiries to particular associates. For example, some associates may be better suited to answering particular types of inquiries. Performance data, such as statistical data about the performance of the associates, may be determined by the inquiry component 738 from the response data 754 provided by the associates. For example, information indicative of a percentage of different inquiries in which the particular associate selected response data 754 that disagreed with the majority of associates may be maintained. In some implementations, test or practice inquiry data 750 having a previously known correct answer may be provided to the associate for training or quality assurance purposes. The determination of the set of associates to use may be based at least in part on the performance data.

By using the inquiry component 738, the event-determination component 130 may be able to provide high reliability output data 626 that accurately represents the event 624. The output data 626 generated by the inquiry component 738 from the response data 754 may also be used to further train the automated systems used by the inventory management system 622. For example, the sensor data 134 and the output data 626, based on response data 754, may be provided to one or more of the components of the inventory management system 622 for training in process improvement. Continuing the example, this information may be provided to an artificial neural network, Bayesian network, and so forth, to further train these systems such that the confidence level 744 and the tentative results 748 produced in the future for the same or similar input is improved. Finally, as FIG. 7 illustrates, the servers 118 may store and/or utilize other data 758.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

What is claimed is:

1. One or more computing devices comprising:
   one or more processors; and
   one or more computer-readable media storing computer-executable instructions that, when executed, cause the one or more processors to perform acts comprising:
      receiving sensor data generated by a sensor in an environment, the sensor data identifying an item;
      determining a camera having a field-of-view (FOV) that includes the sensor;
      receiving image data generated by the camera within the environment, the image data representing the sensor;
      analyzing the image data;
      identifying, based at least in part on the analyzing, a user receiving the item;
      determining a user identifier associated with the user; and
      updating virtual-cart data associated with the user identifier to indicate an item identifier associated with the item.

2. The one or more computing devices as recited in claim 1, wherein the one or more computer-readable media further store computer-executable instructions that, when executed, cause the one or more processors to perform an act comprising identifying, based at least in part on the analyzing, a hand represented in the image data, and wherein the identifying the user receiving the item comprises identifying the user receiving the item comprises based at least in part on identifying the hand represented in the image data.

3. The one or more computing devices as recited in claim 1, wherein the one or more computer-readable media further store computer-executable instructions that, when executed, cause the one or more processors to perform an act comprising determining, based at least in part on receiving the sensor data, a portion of the environment associated with the sensor, and wherein the determining the camera comprises determining the camera having a FOV that includes the portion of the environment.

4. The one or more computing devices as recited in claim 1, wherein the determining the camera comprises determining, from multiple cameras within the environment, the camera having the FOV of the sensor.

5. The one or more computing devices as recited in claim 1, wherein the receiving the sensor data generated by the sensor comprises receiving scan data generated by a scanning device that scanned visual indicia associated with the item.

6. The one or more computing devices as recited in claim 1, wherein the one or more computer-readable media further store computer-executable instructions that, when executed, cause the one or more processors to perform an act comprising receiving data indicating a first time at which the sensor generated the sensor data, and wherein the analyzing comprises analyzing image data generated by the camera after the first time and within a threshold amount of time of the first time.

7. The one or more computing devices as recited in claim 1, wherein:
   the one or more computer-readable media further store computer-executable instructions that, when executed, cause the one or more processors to perform an act comprising determining, based at least in part on receiving the sensor data, a volume of interest (VOI) within the environment relative to the sensor; and
   the analyzing comprises analyzing at least a portion of the image data corresponding to the VOI.

8. The one or more computing devices as recited in claim 1, wherein:
   the one or more computer-readable media further store computer-executable instructions that, when executed, cause the one or more processors to perform an act comprising determining, based at least in part on receiving the sensor data, a volume of interest (VOI) within the environment relative to the sensor;
   the analyzing comprises analyzing at least a portion of the image data corresponding to the VOI; and
   the identifying comprises identifying at least a portion of the user after the portion of the user enters the VOI.

9. The one or more computing devices as recited in claim 1, wherein:
   the one or more computer-readable media further store computer-executable instructions that, when executed, cause the one or more processors to perform an act comprising determining, based at least in part on receiving the sensor data, a volume of interest (VOI) within the environment relative to the sensor;
   the analyzing comprises analyzing at least a portion of the image data corresponding to the VOI;
   the identifying comprises identifying at least a portion of the user within the VOI; and
   the one or more computer-readable media further store computer-executable instructions that, when executed, cause the one or more processors to perform an act comprising identifying the item within the VOI.

10. A method comprising:
   receiving sensor data generated by a sensor in an environment, the sensor data identifying an item;
   determining a camera having a field-of-view (FOV) that includes the sensor;

receiving image data generated by the camera within the environment, the image data representing the sensor;
analyzing the image data;
identifying, based at least in part on the analyzing, a user receiving the item;
determining a user identifier associated with the user; and
updating virtual-cart data associated with the user identifier to indicate an item identifier associated with the item.

11. The method as recited in claim 10, further comprising identifying, based at least in part on the analyzing, a hand represented in the image data, and wherein the identifying the user receiving the item comprises identifying the user receiving the item comprises based at least in part on identifying the hand represented in the image data.

12. The method as recited in claim 10, further comprising determining, based at least in part on receiving the sensor data, a portion of the environment associated with the sensor, and wherein the determining the camera comprises determining the camera having a FOV that includes the portion of the environment.

13. The method as recited in claim 10, wherein the determining the camera comprises determining, from multiple cameras within the environment, the camera having the FOV of the sensor.

14. The method as recited in claim 10, wherein the receiving the sensor data generated by the sensor comprises receiving scan data generated by a scanning device that scanned visual indicia associated with the item.

15. The method as recited in claim 10, further comprising receiving data indicating a first time at which the sensor generated the sensor data, and wherein the analyzing comprises analyzing image data generated by the camera after the first time and within a threshold amount of time of the first time.

16. The method as recited in claim 10, wherein:
the method further comprises determining, based at least in part on receiving the sensor data, a volume of interest (VOI) within the environment relative to the sensor; and
the analyzing comprises analyzing at least a portion of the image data corresponding to the VOI.

17. The method as recited in claim 10, wherein:
the method further comprises determining, based at least in part on receiving the sensor data, a volume of interest (VOI) within the environment relative to the sensor;
the analyzing comprises analyzing at least a portion of the image data corresponding to the VOI; and
the identifying comprises identifying at least a portion of the user after the portion of the user enters the VOI.

18. The method as recited in claim 10, wherein:
the method further comprises determining, based at least in part on receiving the sensor data, a volume of interest (VOI) within the environment relative to the sensor;
the analyzing comprises analyzing at least a portion of the image data corresponding to the VOI;
the identifying comprises identifying at least a portion of the user within the VOI; and
the method further comprises identifying the item within the VOI.

19. One or more non-transitory computer-readable media storing computer-executable instructions that, when executed, cause one or more processors to perform acts comprising:
receiving sensor data generated by a sensor in an environment, the sensor data identifying an item;
determining a camera having a field-of-view (FOV) that includes the sensor;
receiving image data generated by the camera within the environment, the image data representing the sensor;
analyzing the image data;
identifying, based at least in part on the analyzing, a user receiving the item;
determining a user identifier associated with the user; and
updating virtual-cart data associated with the user identifier to indicate an item identifier associated with the item.

20. The one or more non-transitory computer-readable media as recited in claim 19, wherein the receiving the sensor data generated by the sensor comprises receiving scan data generated by a scanning device that scanned visual indicia associated with the item.

\* \* \* \* \*